US012757223B2

(12) United States Patent
Wu

(10) Patent No.: US 12,757,223 B2
(45) Date of Patent: Oct. 6, 2026

(54) MANAGING SIDELINK INFORMATION, CONFIGURATION, AND COMMUNICATION

(71) Applicant: GOOGLE LLC, Mountain View, CA (US)

(72) Inventor: Chih-Hsiang Wu, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 439 days.

(21) Appl. No.: 18/026,784

(22) PCT Filed: Sep. 15, 2021

(86) PCT No.: PCT/US2021/050384
§ 371 (c)(1),
(2) Date: Mar. 16, 2023

(87) PCT Pub. No.: WO2022/060781
PCT Pub. Date: Mar. 24, 2022

(65) Prior Publication Data

US 2023/0403623 A1 Dec. 14, 2023

Related U.S. Application Data

(60) Provisional application No. 63/080,150, filed on Sep. 18, 2020.

(51) Int. Cl.
*H04W 72/25* (2023.01)
*H04W 36/30* (2009.01)

(52) U.S. Cl.
CPC ......... *H04W 72/25* (2023.01); *H04W 36/305* (2018.08)

(58) Field of Classification Search
CPC ............... H04W 72/25; H04W 36/305; H04W 76/27; H04W 72/21; H04W 76/19; H04W 76/14
See application file for complete search history.

(56) References Cited

U.S. PATENT DOCUMENTS

| | | | | |
|---|---|---|---|---|
| 10,952,194 | B2 * | 3/2021 | Sharma | H04W 76/27 |
| 2018/0242228 | A1 | 8/2018 | Jung et al. | |

(Continued)

OTHER PUBLICATIONS

"3rd Generation Partnership Project; Technical Specification Group Radio Access Network; NR; NR and NG-RAN Overall Description; Stage 2 (Release 16)," 3GPP Standard (2020).

(Continued)

*Primary Examiner* — Michael A Keller
(74) *Attorney, Agent, or Firm* — MARSHALL, GERSTEIN & BORUN LLP

(57) ABSTRACT

A user equipment (UE), for managing information related to sidelink communications, when the UE has a radio connection with a radio access network (RAN), (i) transmits (1802), to the RAN, sidelink information for generating, at the RAN, a sidelink configuration for the UE, (ii) determines (1804), subsequently to the transmitting, that the radio connection with the RAN is to be modified, and (iii) processes (1806) the sidelink information in response to the determination. A RAN, for managing information related to sidelink communications, when a UE has a radio connection with the RAN, (i) receives (1902), from the UE, sidelink information, (ii) generates (1904), using the sidelink information, a sidelink configuration for the UE, (iii) determines (1906) that the radio connection with the UE is to be modified, and processes (1908) the sidelink information in response to the determination.

5 Claims, 22 Drawing Sheets

(56) References Cited

U.S. PATENT DOCUMENTS

| | | | | |
|---|---|---|---|---|
| 2018/0368191 | A1 | 12/2018 | Vutukuri et al. | |
| 2020/0045674 | A1 * | 2/2020 | Tseng | H04W 76/14 |
| 2020/0260353 | A1 | 8/2020 | Xu et al. | |
| 2023/0319852 | A1 * | 10/2023 | Lee | H04W 72/23<br>370/328 |
| 2024/0323716 | A1 * | 9/2024 | Krishnan | H04W 76/14 |

OTHER PUBLICATIONS

Huawei et al., "Miscellaneous Stage-2 Corrections for NR SL Communication in TS 38.300," 3GPP Draft (2020).

International Search Report and Written Opinion for Application No. PCT/US2021/050384, dated Dec. 6, 2021.

"3rd Generation Partnership Project; Technical Specification Group Radio Access Network; Evolved Universal Terrestrial Radio Access (E-UTRA); Packet Data Convergence Protocol (PDCP) specification (Release 16), "3GPP TS 36.323 V16.1.0 (Jul. 2020).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.9.0 (2020).

"3rd Generation Partnership Project; Technical Specification Group Radio Access Network; Evolved Universal Terrestrial Radio Access (E-UTRA); Radio Resource Control (RRC); Protocol specification (Release 16)," 3GPP TS 36.331 V16.1.1 (2020).

"3rd Generation Partnership Project; Technical Specification Group Radio Access Network; NR; NR and NG-RAN Overall Description; Stage 2 (Release 16)," 3GPP TS 38.300 V16.2.0 (2020).

"3rd Generation Partnership Project; Technical Specification Group Radio Access Network; NR; Packet Data Convergence Protocol (PDCP) specification (Release 16)," 3GPP TS 38.323 V16.1.0 (2020).

"3rd Generation Partnership Project; Technical Specification Group Radio Access Network; NR; Radio Resource Control (RRC) protocol specification (Release 16)," 3GPP TS 38.331 V16.1.0 (2020).

* cited by examiner

MANAGING SIDELINK INFORMATION, CONFIGURATION, AND COMMUNICATION

CROSS-REFERENCE TO RELATED APPLICATIONS

This patent application is a national stage application, filed under 35 U.S.C. § 371, of International Application No. PCT/US2021/050384, filed Sep. 15, 2021 and entitled "MANAGING SIDELINK INFORMATION, CONFIGURATION, AND COMMUNICATION," which claims priority to U.S. Provisional Application No. 63/080,150, filed Sep. 18, 2020 and entitled "MANAGING SIDELINK INFORMATION, CONFIGURATION, AND COMMUNICATION," the disclosures of which are incorporated by reference herein in their entireties.

FIELD OF THE DISCLOSURE

This disclosure relates generally to wireless communications and, more particularly, to sidelink communication operations.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides services for signaling radio bearers (SRBs) to the Radio Resource Control (RRC) sublayer. The PDCP sublayer also provides services for data radio bearers (DRBs) to a Service Data Adaptation Protocol (SDAP) sublayer or a protocol layer such as an Internet Protocol (IP) layer, an Ethernet protocol layer, and an Internet Control Message Protocol (ICMP) layer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating as the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of the MN, the SN, or both the MN and the SN can be referred to as split DRBs.

The UE in some scenarios can concurrently utilize resources of multiple nodes (e.g., base stations or components of a distributed base station) of a radio access network (RAN), interconnected by a backhaul. When these network nodes support different radio access technologies (RATs), this type of connectivity is referred to as Multi-Radio Dual Connectivity (MR-DC). When a UE operates in MR-DC, one base station operates as the MN that covers a primary cell (PCell), and the other base station operates as the SN that covers a primary secondary cell (PSCell). The UE communicates with the MN (via the PCell) and the SN (via the PSCell). In other scenarios, the UE utilizes resources of one base station at a time. One base station and/or the UE determines that the UE should establish a radio connection with another base station. For example, one base station can determine to hand the UE over to the second base station, and initiate a handover procedure. The UE in other scenarios can concurrently utilize resources of a RAN node (e.g., a single base station or a component of a distributed base station), interconnected by a backhaul.

In some cases, a UE can communicate with another UE using a so-called sidelink, or a radio link that directly interconnects a pair of UEs without a base station. Sidelink communications can conform for example to vehicle-to-everything (V2X) sidelink communication protocols specified in 3GPP specification 38.300 v16.2.0 (2020-07) section 16.9 and 38.331 v16.1.0 (2020-07). Although the UEs exchange sidelink data directly, a base station can allocate, or facilitate allocation of, radio resources for sidelink communication in a licensed spectrum and/or unlicensed spectrum (e.g., within WLAN frequencies which the base station announces via a system information broadcast). Moreover, the licensed spectrum can include Citizens Broadband Radio Service (CBRS) frequencies in some geographic regions or licensed shared access (LSA) frequencies in other geographic regions.

Generally, the UE can perform sidelink communication with another UE by using a sidelink configuration (e.g., common, exceptional, preconfigured sidelink configuration) . The UE can receive these configuration(s) from the RAN in an RRC message or in a broadcast, or can be preconfigured with a sidelink configuration by its manufacturer. In some scenarios, the UE can provide sidelink UE information to the RAN to request a particular sidelink configuration (e.g., based on one or more frequencies the UE prefers). However, it is not clear how a RAN manages the sidelink UE information in certain scenarios. For example, when the UE encounters failure on a radio connection with a RAN or when the UE transitions from the connected state to an inactive state, it is not clear how the UE and/or the RAN handles the sidelink UE information. More generally, a RAN cannot always properly reconcile the radio connection failure or UE state transitions with the sidelink UE information previously provided by the UE.

SUMMARY

Generally speaking, a UE and/or RAN implement the techniques of this disclosure to manage UE information relevant to sidelink communications. A RAN having a radio connection with a UE can receive UE information relevant to sidelink communications from the UE, and determine to either retain or release the UE information after determining that the radio connection with the UE is to be modified. The UE can also either retain or release the UE information after determining that the radio connection with the UE is to be modified. The UE can retransmit the retained UE information or transmit new UE information to the RAN, in some implementations.

One example embodiment of these techniques is a method in a UE for managing information related to sidelink communications, when the UE has a radio connection with the RAN. The method can be executed by processing hardware and includes (i) transmitting, to a RAN, sidelink information for generating, at the RAN, a sidelink configuration for the UE, (ii) determining, subsequently to the transmitting, that the radio connection with the RAN is to be modified, and (iii) processing the sidelink information in response to the determination.

Another embodiment of these techniques is a UE including processing hardware configured to execute the method above.

Yet another example embodiment of these techniques is a method implemented in a RAN for managing information related to sidelink communications, when a UE has a radio connection with the RAN. The method can be executed by processing hardware and includes (i) receiving, from the UE, sidelink information, (ii) generating, using the sidelink information, a sidelink configuration for the UE, (iii) determining that the radio connection with the UE is to be modified, and (iv) processing the sidelink information in response to the determination.

Still another example embodiment of these techniques is one or more base stations including processing hardware configured to execute the method above.

DETAILED DESCRIPTION OF THE DRAWINGS

Figure 1A:
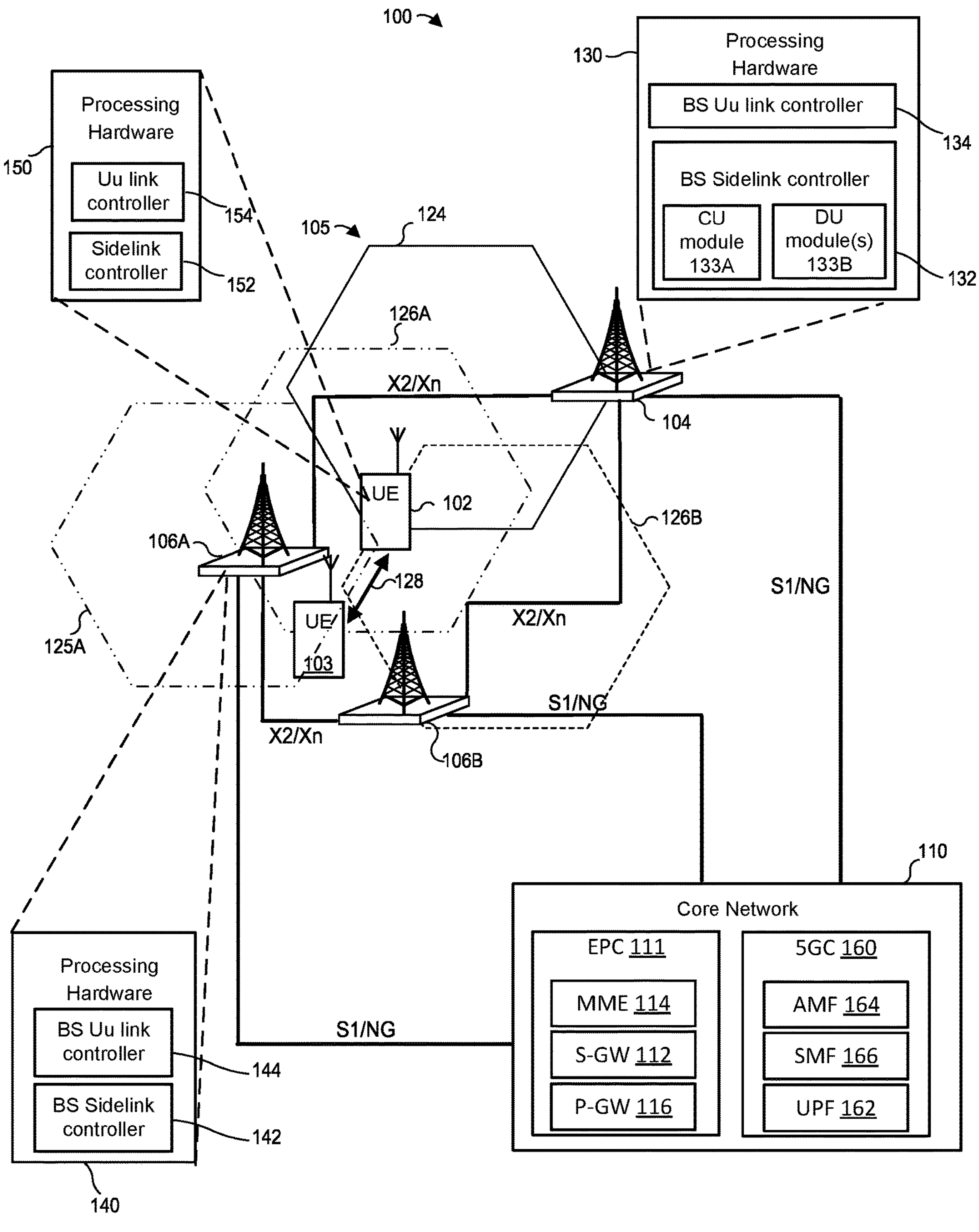
FIG. 1A is a block diagram of an example system in which a UE and/or RAN can implement the techniques of this disclosure for managing sidelink UE information.

FIG. 1A depicts an example wireless communication system 100 that can implement the sidelink configuration and management techniques of this disclosure. The wireless communication system 100 includes UEs 102, 103, and base stations 104, 106A, 106B that are connected to a core network (CN) 110. The base stations 104, 106A, 106B can be any suitable type, or types, of base stations, such as an evolved node B (eNB), a next-generation eNB (ng-eNB), or a 5G Node B (gNB), for example. As a more specific example, the base station 104 can be an eNB or a gNB, and the base stations 106A and 106B can be gNBs. The base stations form a radio access network (RAN) 105.

The base station 104 supports a cell 124, the base station 106A supports a cell 126A, and the base station 106B supports a cell 126B. The base station 106A may additionally support a cell 125A. The cell 124 partially overlaps with both of cells 126A and 126B, such that the UE 102 can be in range to communicate with base station 104 while simultaneously being in range to communicate with base station 106A or 106B (or in range to detect or measure the signal from both base stations 106A or 106B, etc.). The overlap can make it possible for the UE 102 to hand over between cells (e.g., from cell 124 to cell 126A or 126B) or base stations (e.g., from base station 104 to base station 106A or base station 106B) before the UE 102 experiences radio link failure, for example. Moreover, the overlap allows the various dual connectivity (DC) scenarios discussed below. For example, the UE 102 can communicate in DC with the base station 104 (operating as an MN) and the base station 106A (operating as an SN) and, upon completing a handover, can communicate with the base station 106B (operating as an MN). As another example, the UE 102 can communicate in DC with the base station 104 (operating as an MN) and the base station 106A (operating as an SN) and, upon completing an SN change, can communicate with the base station 104 (operating as an MN) and the base station 106B (operating as an SN).

More particularly, when the UE 102 is in DC with the base station 104 and the base station 106A, the base station 104 operates as a master eNB (MeNB), a master ng-eNB (Mng-eNB), or a master gNB (MgNB), and the base station 106A operates as a secondary gNB (SgNB) or a secondary ng-eNB (Sng-eNB). In implementations and scenarios where the UE 102 is in SC with the base station 104 but is capable of operating in DC, the base station 104 operates as an MeNB, an Mng-eNB or an MgNB, and the base station 106A operates as a candidate SgNB (C-SgNB) or a candidate Sng-eNB (C-Sng-eNB). Although various scenarios are described below in which the base station 104 operates as an MN and the base station 106A (or 106B) operates as an SN or T-SN, any of the base stations 104, 106A, 106B generally can operate as an MN, an SN or a T-SN in different scenarios. Thus, in some implementations, the base station 104, the base station 106A, and the base station 106B can implement similar sets of functions and each support MN, SN, and T-SN operations.

In operation, the UE 102 can use a radio bearer (e.g., a DRB or an SRB) that at different times terminates at an MN (e.g., the base station 104) or an SN (e.g., the base station 106A). For example, after handover to the base station 106B, the UE 102 can use a radio bearer (e.g., a DRB or an SRB) that at different times terminates at the base station 106B. The UE 102 can apply one or more security keys when communicating on the radio bearer, in the uplink (from the UE 102 to a base station) and/or downlink (from a base station to the UE 102) direction.

In some scenarios, the UE 102 performs sidelink communications (e.g., for V2X or a proximity service) with the UE 103 via a sidelink 128. The sidelink communication can be NR sidelink communication and/or V2X sidelink communication. When the UE 102 is within the area of coverage of the RAN 105, one or more base stations of the RAN 105 can configure and control the sidelink communication via dedicated signaling (e.g., an RRC reconfiguration message) or broadcast system information (e.g., system information block(s)).

When the UE 102 operates in the RRC CONNECTED state, the UE 102 can send a SidelinkUEInformation message to the RAN 105 to indicate that the UE 102 interested in sidelink communication, request or release sidelink resources for the sidelink communication, and/or report QoS information for each destination in the sidelink communication. For example, the RAN 105 provides an RRCReconfiguration message to the UE 102 in order to provide the UE with dedicated sidelink configuration after the RAN 105 receives the SidelinkUEInformation message. The RRCReconfiguration message can include a sidelink radio bearer (SLRB) configuration for NR sidelink communication as well as sidelink scheduling configuration or resource pool configuration. If UE 102 has received an SLRB configuration via a system information broadcast, the UE 102 should continue using the configuration to perform sidelink data transmissions and receptions until the UE 102 receives a new configuration via the RRCReconfiguration message. During handover, the UE 102 performs sidelink communications (e.g., transmission and/or reception) based on configuration of the exceptional transmission resource pool or configured sidelink grant Type 1 and/or reception resource pool of a target cell as provided in a handover command message.

The base station 104 includes processing hardware 130, which can include one or more general-purpose processors (e.g., central processing units (CPUs) and a computer-readable memory storing machine-readable instructions executable on the one or more general-purpose processor(s), and/or special-purpose processing units. The processing hardware 130 in the example of FIG. 1A implements a base station sidelink controller 132 configured to manage or control sidelink configurations and procedures. For example, the base station sidelink controller 132 can be configured to support RRC messaging associated with sidelink configuration and procedures. Further, when the base station 104 is distributed (see FIG. 1B below), the base station sidelink controller 132 can include a CU component 133A operating in the CU and a respective DU component 133B operating in each of the DUs. The CU component 133A and the DU component 133B can communicate via a dedicated interface illustrated in FIG. 1B.

The processing hardware 130 also includes a base station Uu link controller 134 that is configured to manage or control a Uu link (i.e., a link between the UE 102 and the base station 104). For example, the base station Uu link controller 134 can be configured to support RRC messaging associated with RRC procedures for managing or controlling radio resources for the UE 102 to communicate with the base station 104, and/or to support the necessary operations when the base station 104 operates as an MN, as discussed below.

The base station 106A includes processing hardware 140, which can include one or more general-purpose processors (e.g., CPUs) and a computer-readable memory storing machine-readable instructions executable on the general-purpose processor(s), and/or special-purpose processing units. The processing hardware 140 in the example implementation in FIG. 1A includes a base station sidelink controller 142 that is configured to manage or control sidelink configurations and procedures. For example, the base station sidelink controller 142 can be configured to support RRC messaging associated with sidelink configuration and procedures. The processing hardware 140 includes a base station Uu link controller 144 that is configured to manage or control a Uu link (i.e., a link between the UE 102 and the base station 106A). For example, the base station Uu link controller 144 can be configured to support RRC messaging associated with RRC procedures for managing or controlling radio resources for the UE 102 to communicate with the base station 106A, and/or to support the necessary operations when the base station 106A operates as an MN or SN, as discussed below.

The UE 102 includes processing hardware 150, which can include one or more general-purpose processors (e.g., CPUs) and a computer-readable memory storing machine-readable instructions executable on the general-purpose processor(s), and/or special-purpose processing units. The processing hardware 150 in the example implementation in FIG. 1A includes a UE sidelink controller 152 that is configured to manage or control sidelink configurations and procedures. For example, the UE sidelink controller 152 can be configured to support RRC messaging associated with sidelink configuration and procedures. The processing hardware 150 includes a UE Uu link controller 154 that is configured to manage or control a Uu link (i.e., a link between the UE 102 and the RAN 105) according to configuration parameters received from the RAN 105. For example, the UE Uu link controller 152 can be configured to support RRC messaging associated with RRC procedures for managing or controlling radio resources in accordance with any of the implementations discussed below.

The CN 110 can be an evolved packet core (EPC) 111 or a fifth-generation core (5GC) 160, both of which are depicted in FIG. 1A. The base station 104 can be an eNB supporting an S1 interface for communicating with the EPC 111, an ng-eNB supporting an NG interface for communicating with the 5GC 160, or as a gNB that supports the NR radio interface as well as an NG interface for communicating with the 5GC 160. The base station 106A can be an EN-DC gNB (en-gNB) with an S1 interface to the EPC 111, an en-gNB that does not connect to the EPC 111, a gNB that supports the NR radio interface and an NG interface to the 5GC 160, or a ng-eNB that supports a EUTRA radio interface and an NG interface to the 5GC 160. To directly exchange messages with each other during the scenarios discussed below, the base stations 104, 106A, and 106B can support an X2 or Xn interface.

Among other components, the EPC 111 can include a Serving Gateway (S-GW) 112, a Mobility Management Entity (MME) 114 and a Packet Data Network (PDN) Gateway (P-GW) 116. The S-GW 112 and/or P-GW 116 is/are generally configured to transfer user-plane packets related to audio calls, video calls, Internet traffic, etc., and the MME 114 is configured to manage authentication, registration, paging, and other related functions. The 160 includes a User Plane Function (UPF) 162 and an Access and Mobility Management (AMF) 164, and/or Session Management Function (SMF) 166. The UPF 162 is generally configured to transfer user-plane packets related to audio calls, video calls, Internet traffic, etc., the AMF 164 is configured to manage authentication, registration, paging, and other related functions, and the SMF 166 is configured to manage PDU sessions.

Generally, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure can also apply to other suitable radio access and/or core network technologies such as sixth generation (6G) radio access and/or 6G core network or 5G NR-6G DC, for example.

In different configurations or scenarios of the wireless communication system 100, the base station 104 can operate as an MeNB, an Mng-eNB, or an MgNB, the base station 106B can operate as an MeNB, an Mng-eNB, an MgNB, an SgNB, or an Sng-eNB, and the base station 106A can operate as an SgNB or an Sng-eNB. The UE 102 can communicate with the base station 104 and the base station 106A or 106B via the same radio access technology (RAT), such as EUTRA or NR, or via different RATs.

When the base station 104 is an MeNB and the base station 106A is an SgNB, the UE 102 can be in EUTRA-NR DC (EN-DC) with the MeNB 104 and the SgNB 106A. When the base station 104 is an Mng-eNB and the base station 106A is an SgNB, the UE 102 can be in next generation (NG) EUTRA-NR DC (NGEN-DC) with the Mng-eNB 104 and the SgNB 106A. When the base station 104 is an MgNB and the base station 106A is an SgNB, the UE 102 can be in NR-NR DC (NR-DC) with the MgNB 104 and the SgNB 106A. When the base station 104 is an MgNB and the base station 106A is a Sng-eNB, the UE 102 can be in NR-EUTRA DC (NE-DC) with the MgNB 104 and the Sng-eNB 106A.

Figure 1B:
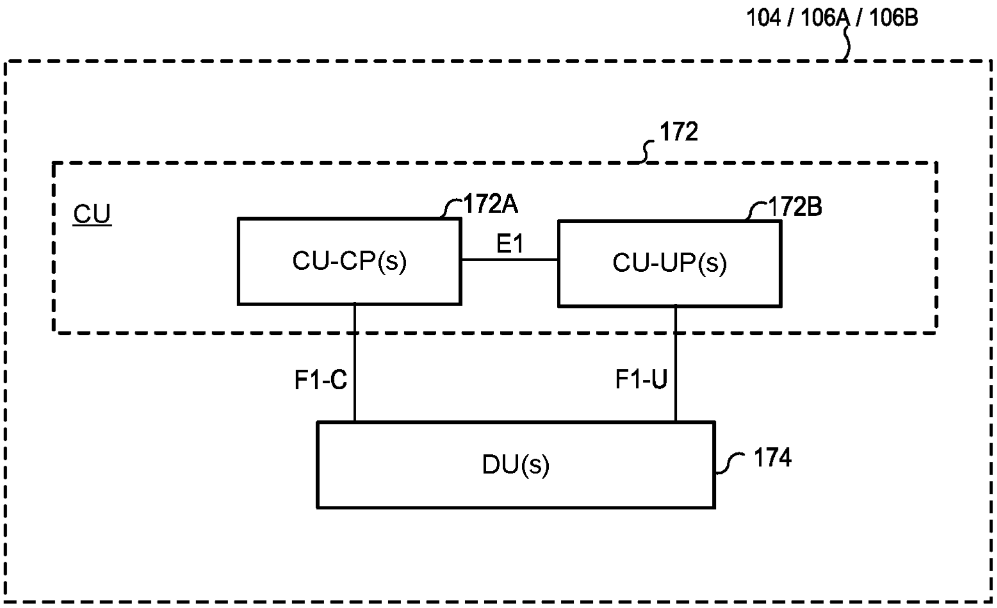
FIG. 1B is a block diagram of an example base station in which a centralized unit (CU) and a distributed unit (DU) can operate in the system of FIG. 1A.

FIG. 1B depicts an example, distributed or disaggregated implementation of any one or more of the base stations 104, 106A, 106B. In this implementation, the base station 104, 106A, or 106B includes a centralized unit (CU) 172 and one or more DUs 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include the processing hardware 130 or 140 of FIG. 1A. In an example implementation, the processing hardware of the CU 172 includes the CU module 133A of the base station sidelink controller 132.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a medium access control (MAC) controller configured to manage or control one or more MAC operations or procedures (e.g., a random access procedure), and a radio link control (RLC) controller configured to manage or control one or more RLC operations or procedures when the base station (e.g., base station 106A) operates as an MN or an SN. The process hardware can also include a physical layer controller configured to manage or control one or more physical layer operations or procedures. In an example implementation, the processing hardware of each DU 174 includes the DU module 133B of the base station sidelink controller 132.

In some implementations, the CU 172 can include a logical node CU-CP 172A that hosts the control plane part of the Packet Data Convergence Protocol (PDCP) protocol of the CU 172. The CU 172 can also include logical node(s) CU-UP 172B that hosts the user plane part of the PDCP protocol and/or Service Data Adaptation Protocol (SDAP) protocol of the CU 172.

The CU-CP 172A can be connected to multiple CU-UP 172B through the E1 interface. The CU-CP 172A selects the appropriate CU-UP 172B for the requested services for the UE 102. In some implementations, a single CU-UP 172B can be connected to multiple CU-CP 172A through the E1 interface. The CU-CP 172A can be connected to one or more DU 174*s* through an F1-C interface. The CU-UP 172B can be connected to one or more DU 174 through the F1-U interface under the control of the same CU-CP 172A. In some implementations, one DU 174 can be connected to multiple CU-UP 172B under the control of the same CU-CP 172A. In such implementations, the connectivity between a CU-UP 172B and a DU 174 is established by the CU-CP 172A using Bearer Context Management functions.

Figure 2A:
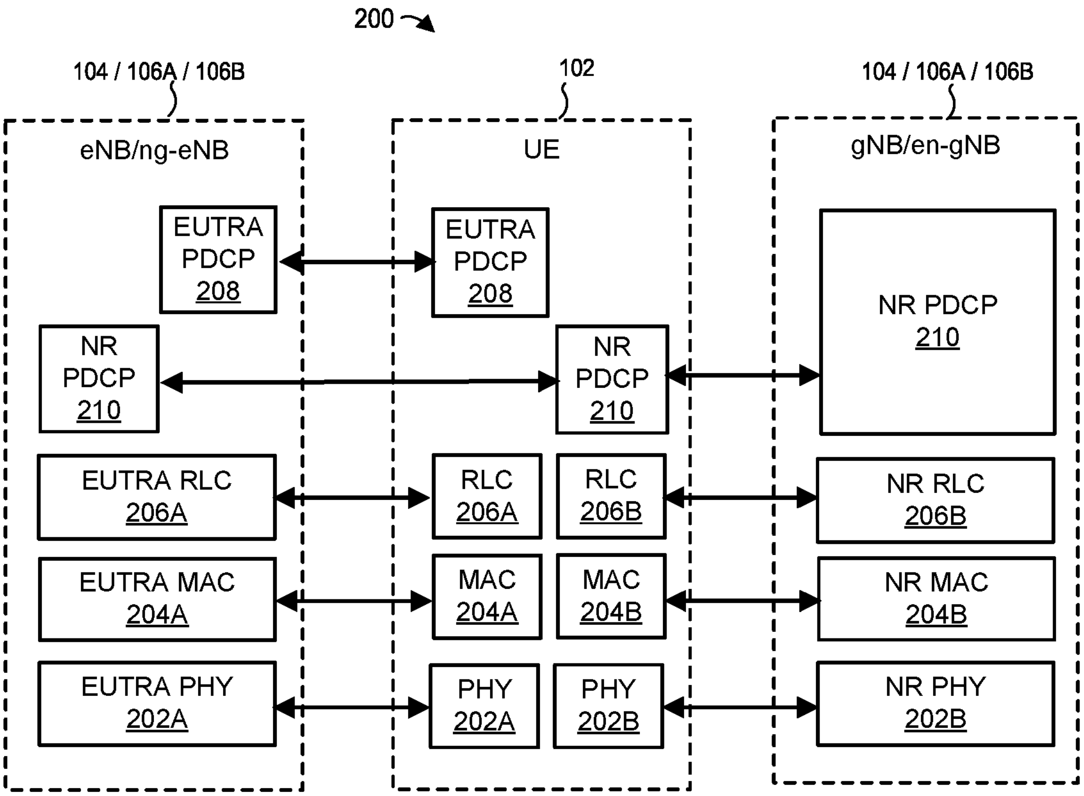
FIG. 2A is a block diagram of an example protocol stack according to which the UE of FIG. 1A can communicate with base stations of FIG. 1A.

FIG. 2A illustrates, in a simplified manner, an example protocol stack 200 according to which the UE 102 can communicate with an eNB/ng-eNB or a gNB (e.g., one or more of the base stations 104, 106A, 106B).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels to the NR PDCP sublayer 210. The UE 102, in some implementations, supports both the EUTRA and the NR stack as shown in FIG. 2A, to support handover between EUTRA and NR base stations and/or to support DC over EUTRA and NR interfaces. Further, as illustrated in FIG. 2A, the UE 102 can support layering of NR PDCP 210 over EUTRA RLC 206A.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages, for example. On a user plane, the EUTRA PDCP sublayer 208 and the NR PDCP sublayer 210 can provide DRBs to support data exchange.

In scenarios where the UE 102 operates in EUTRA/NR DC (EN-DC), with the base station 104 operating as an MeNB and the base station 106A operating as an SgNB, the wireless communication system 100 can provide the UE 102 with an MN-terminated bearer that uses EUTRA PDCP sublayer 208, or an MN-terminated bearer that uses NR PDCP sublayer 210. The wireless communication system 100 in various scenarios can also provide the UE 102 with an SN-terminated bearer, which uses only the NR PDCP sublayer 210. The MN-terminated bearer can be an MCG bearer or a split bearer. The SN-terminated bearer can be an SCG bearer or a split bearer. The MN-terminated bearer can be an SRB (e.g., SRB1 or SRB2) or a DRB. The SN-terminated bearer can be an SRB or a DRB.

Figure 2B:
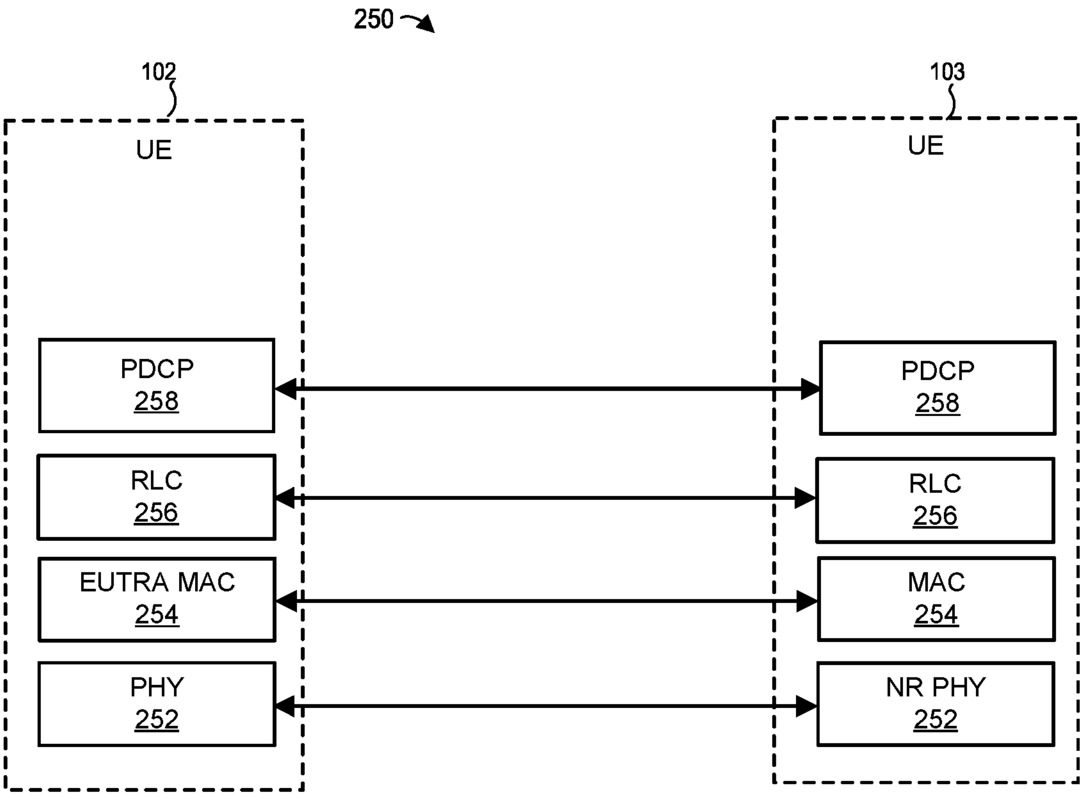
FIG. 2B is a block diagram of an example protocol stack according to which the UEs of FIG. 1A can communicate directly, without the RAN.

FIG. 2B illustrates, in a simplified manner, an example protocol stack 250 for sidelink communication between the UE 102 and the UE 103.

In the example stack 250, a physical layer (PHY) 252 provides transport channels to the MAC sublayer 254, which in turn provides logical channels to the RLC sublayer 256. The RLC sublayer 256 in turn provides RLC channels to the PDCP sublayer 258. In some implementations, the example stack 250 can comply to EUTRA or NR.

The PDCP sublayer 258 receives packets (e.g., from an Internet Protocol (IP) layer, layered directly or indirectly over the PDCP layer 258) that can be referred to as service data units (SDUs), and outputs packets (e.g., to the RLC layer 256) that can be referred to as protocol data units (PDUs). Except where the difference between SDUs and PDUs is relevant, this disclosure for simplicity refers to both SDUs and PDUs as "packets". On a control plane, the PDCP sublayer 258 can provide one or more sidelink SRBs to exchange RRC messages between the UEs 102 and 103, for example. On a user plane, the PDCP sublayer 258 can provide one or more sidelink DRBs to support data exchange between the UEs 102 and 103.

Figure 3A:
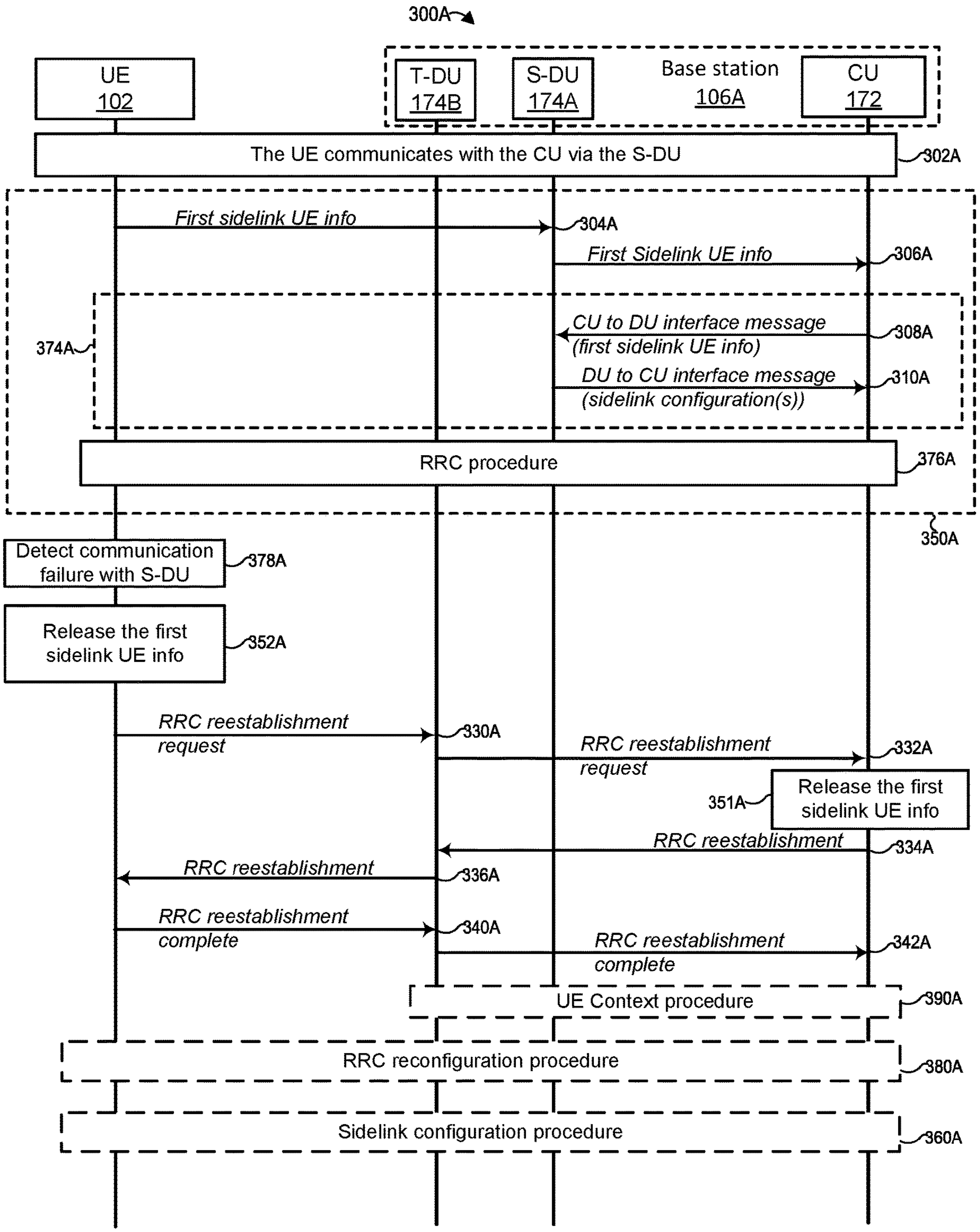
FIG. 3A is a messaging diagram of an example scenario in which the UE and/or distributed base station releases sidelink UE information during an RRC reestablishment procedure after determining failure on a radio connection between the UE and the distributed base station.
Figure 3B:
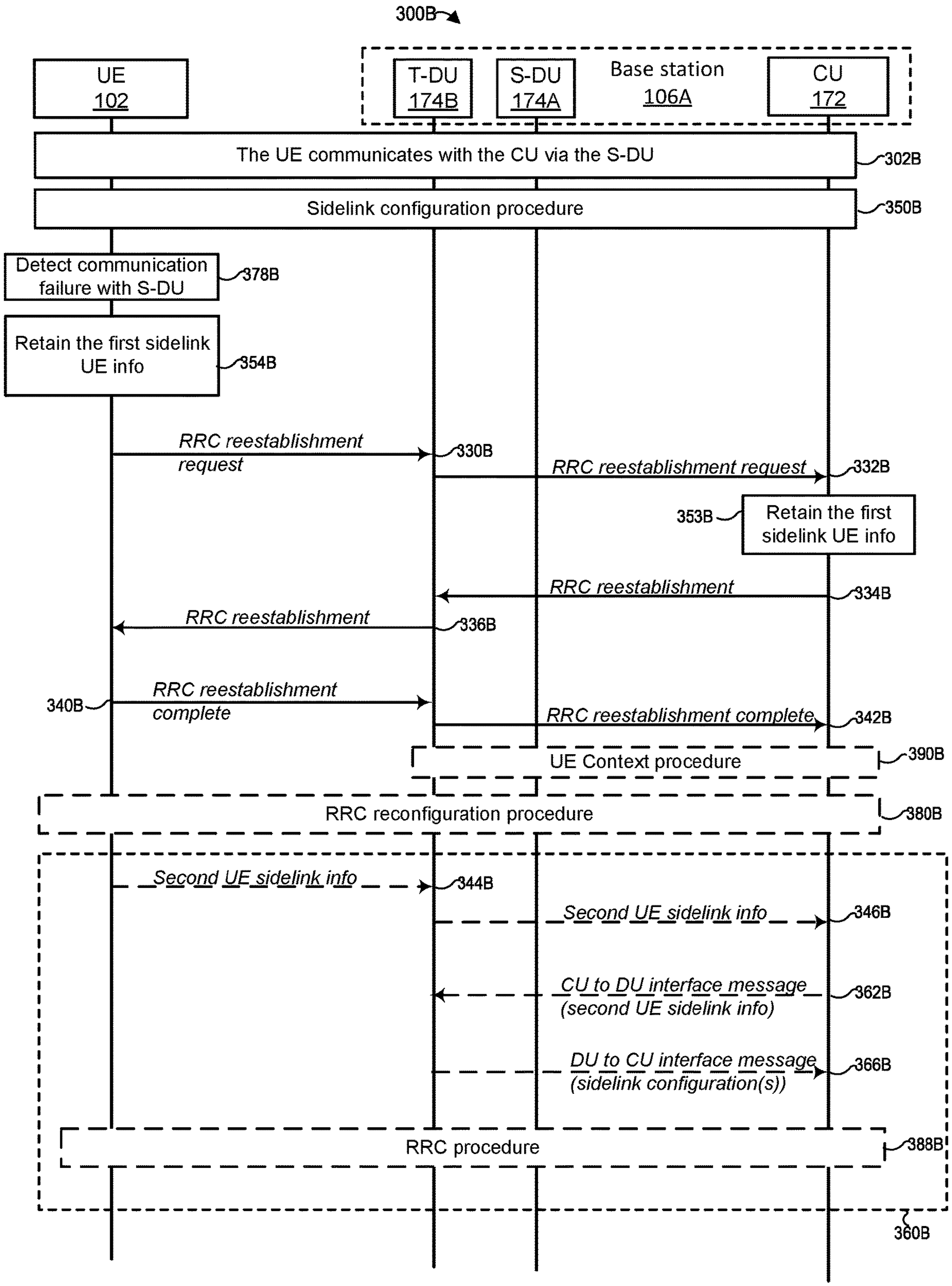
FIG. 3B is a messaging diagram of an example scenario in which the UE and/or distributed base station retains sidelink UE information after determining failure on a radio connection between the UE and the distributed base station.
Figure 4A:
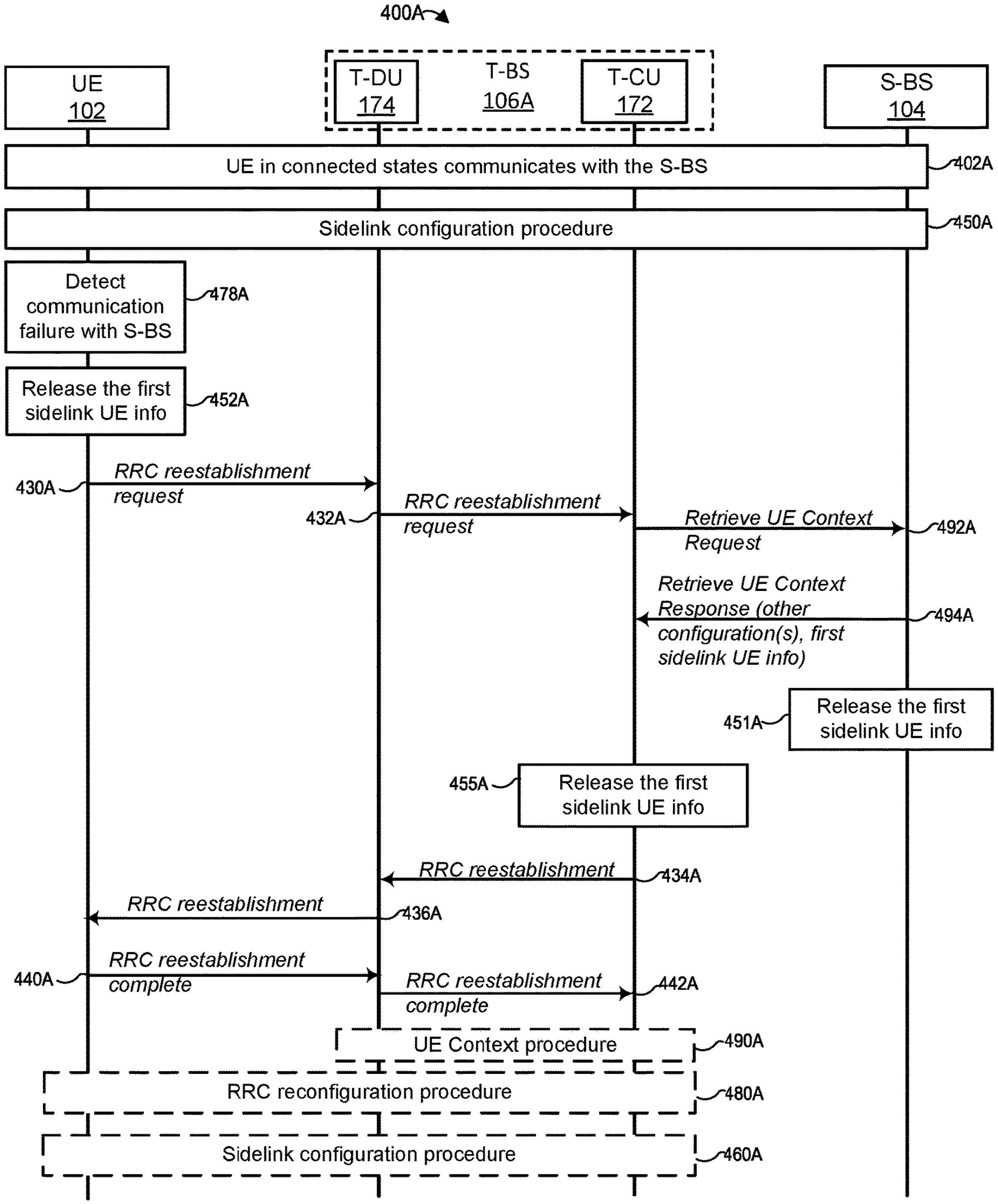
FIG. 4A is a messaging diagram of an example scenario in which a source base station forwards sidelink UE information of a UE to a target base station, which subsequently releases the sidelink UE information during an RRC reestablishment procedure.
Figure 4B:
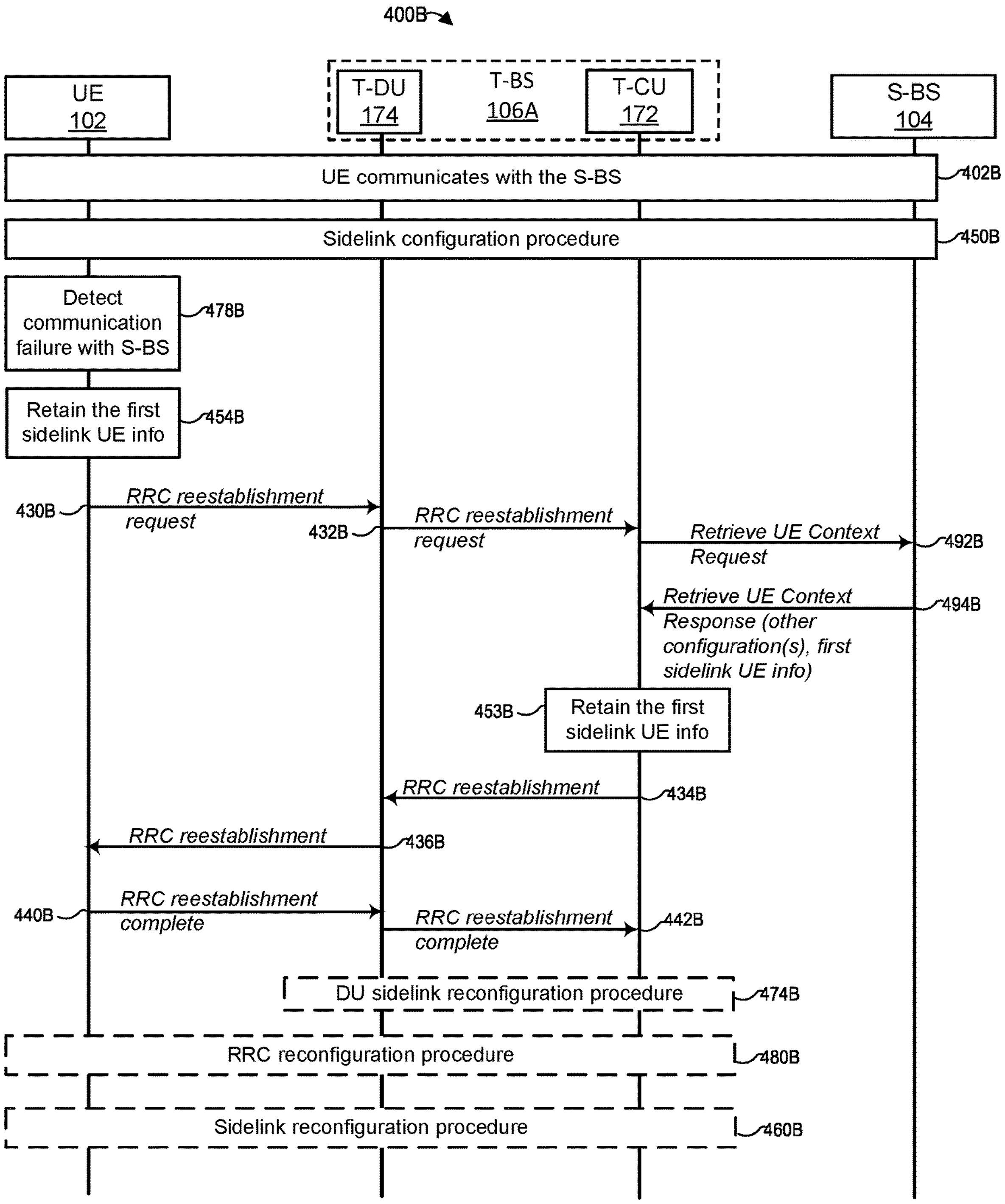
FIG. 4B is a messaging diagram of an example scenario in which a source base station forwards sidelink UE information of a UE to a target base station, which subsequently retains the sidelink UE information during an RRC reestablishment procedure.
Figure 5:
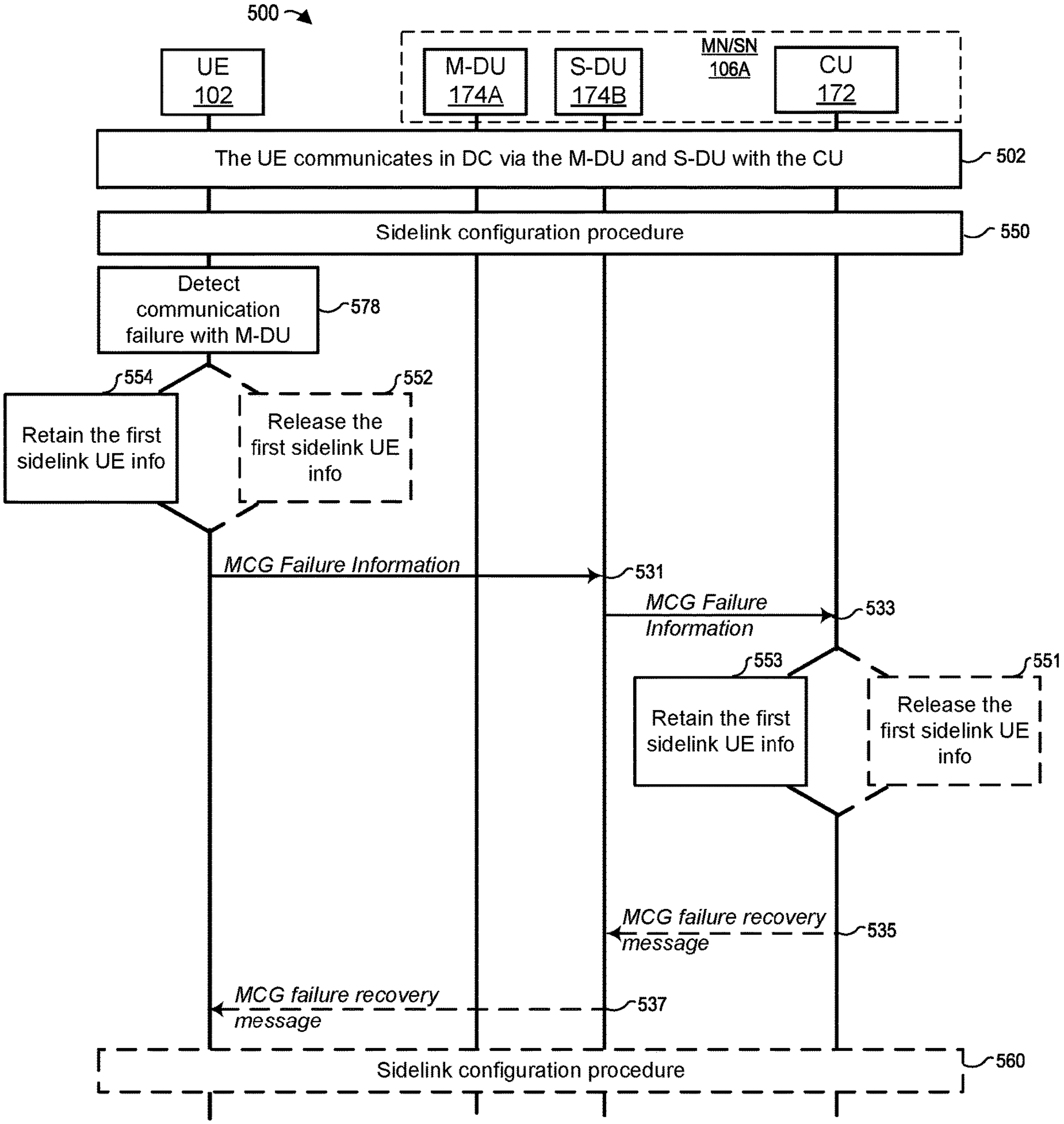
FIG. 5 is a messaging diagram of an example scenario in which the UE and/or distributed base station either retains or releases sidelink UE information during a fast MCG recovery procedure after determining failure on a radio connection between the UE and the distributed base station.
Figure 6:
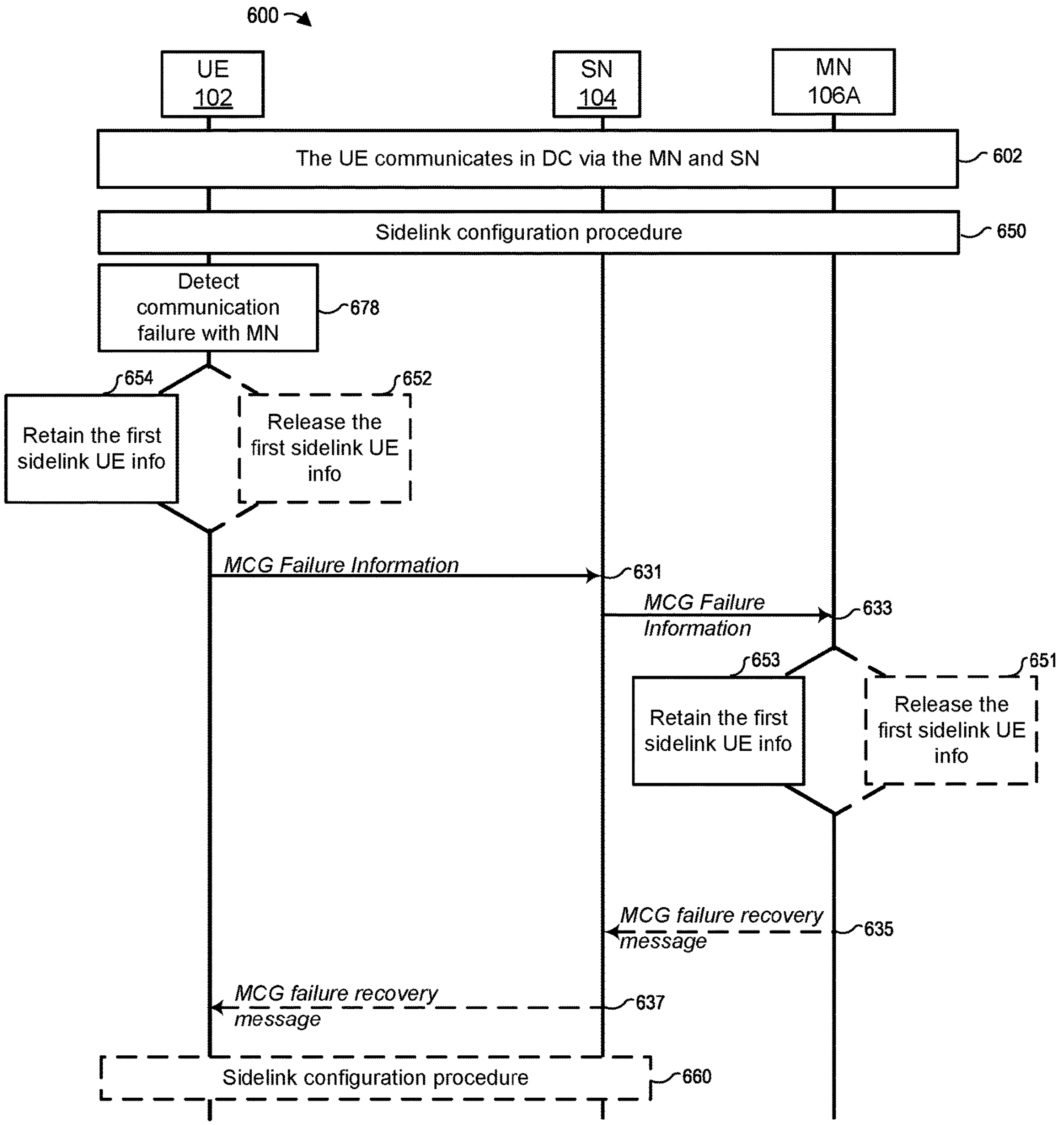
FIG. 6 is a messaging diagram of an example scenario in which the UE and/or MN either retains or releases sidelink UE information during a fast MCG recovery procedure after determining failure on a radio connection between the UE and the MN.
Figure 7A:
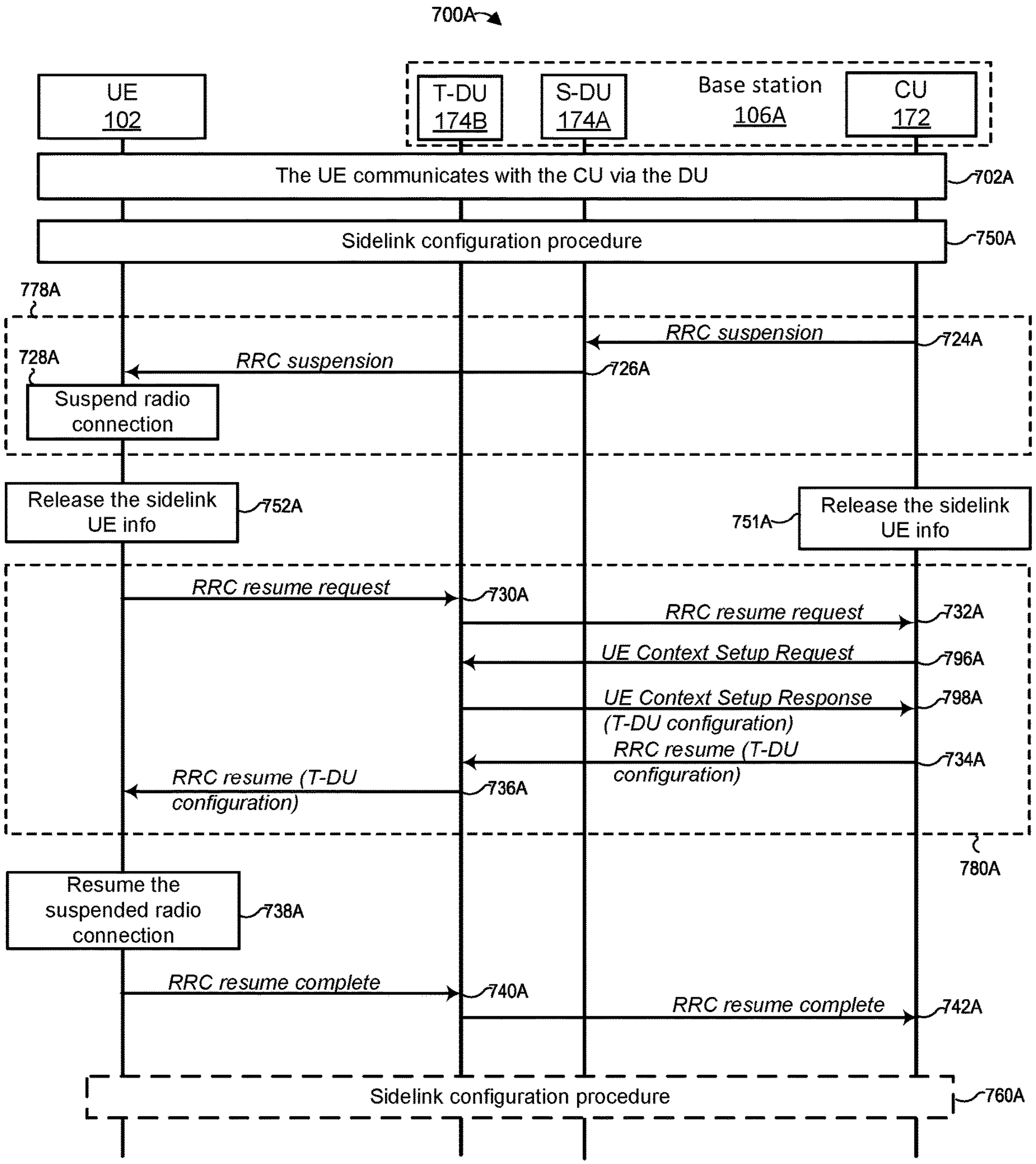
FIG. 7A is a messaging diagram of an example scenario in which the UE and/or distributed base station releases sidelink UE information after suspending a radio connection between the UE and the distributed base station.
Figure 7B:
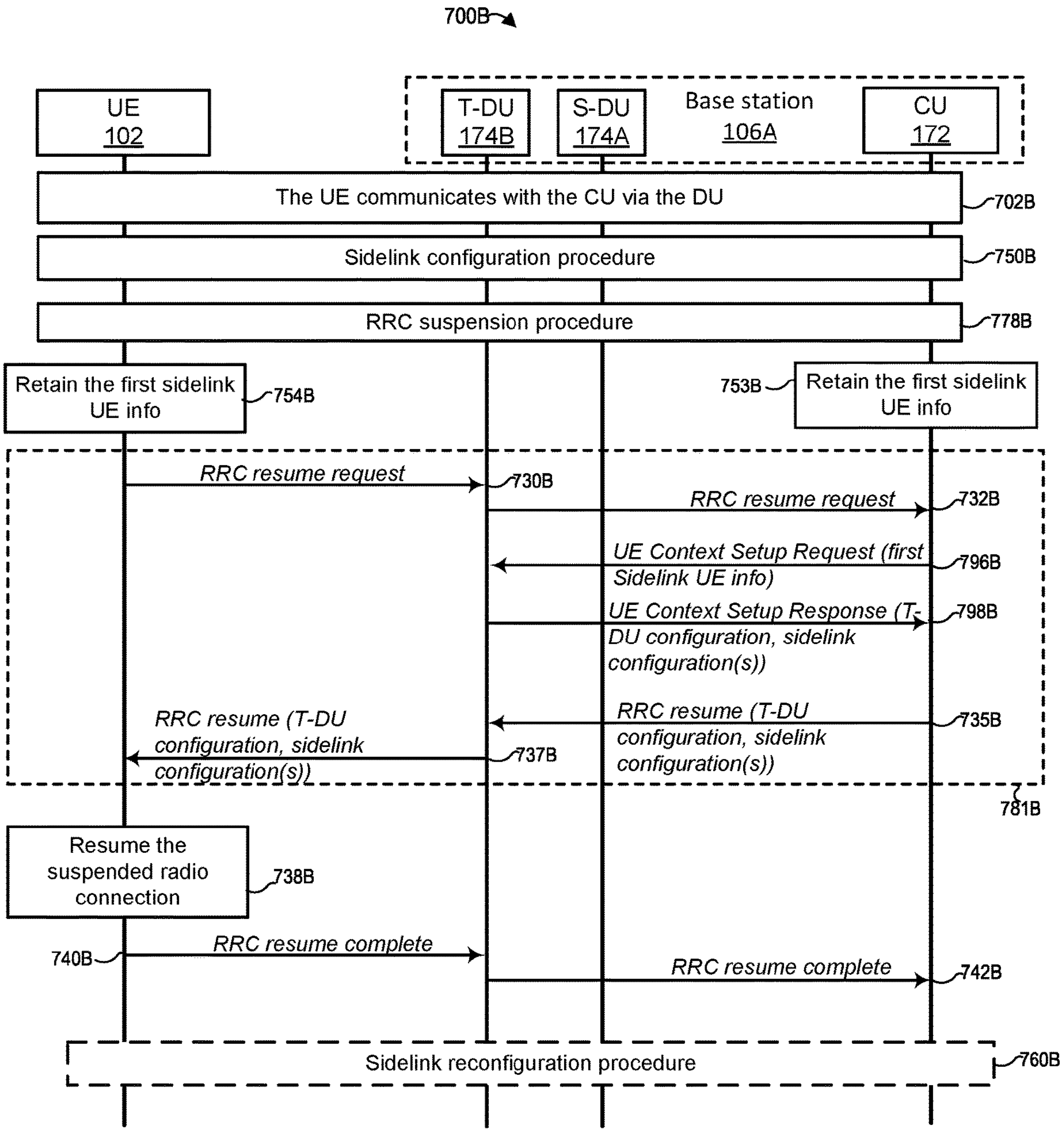
FIG. 7B is a messaging diagram of an example scenario in which the UE and/or distributed base station retains sidelink UE information after suspending a radio connection between the UE and the distributed base station.
Figure 8A:
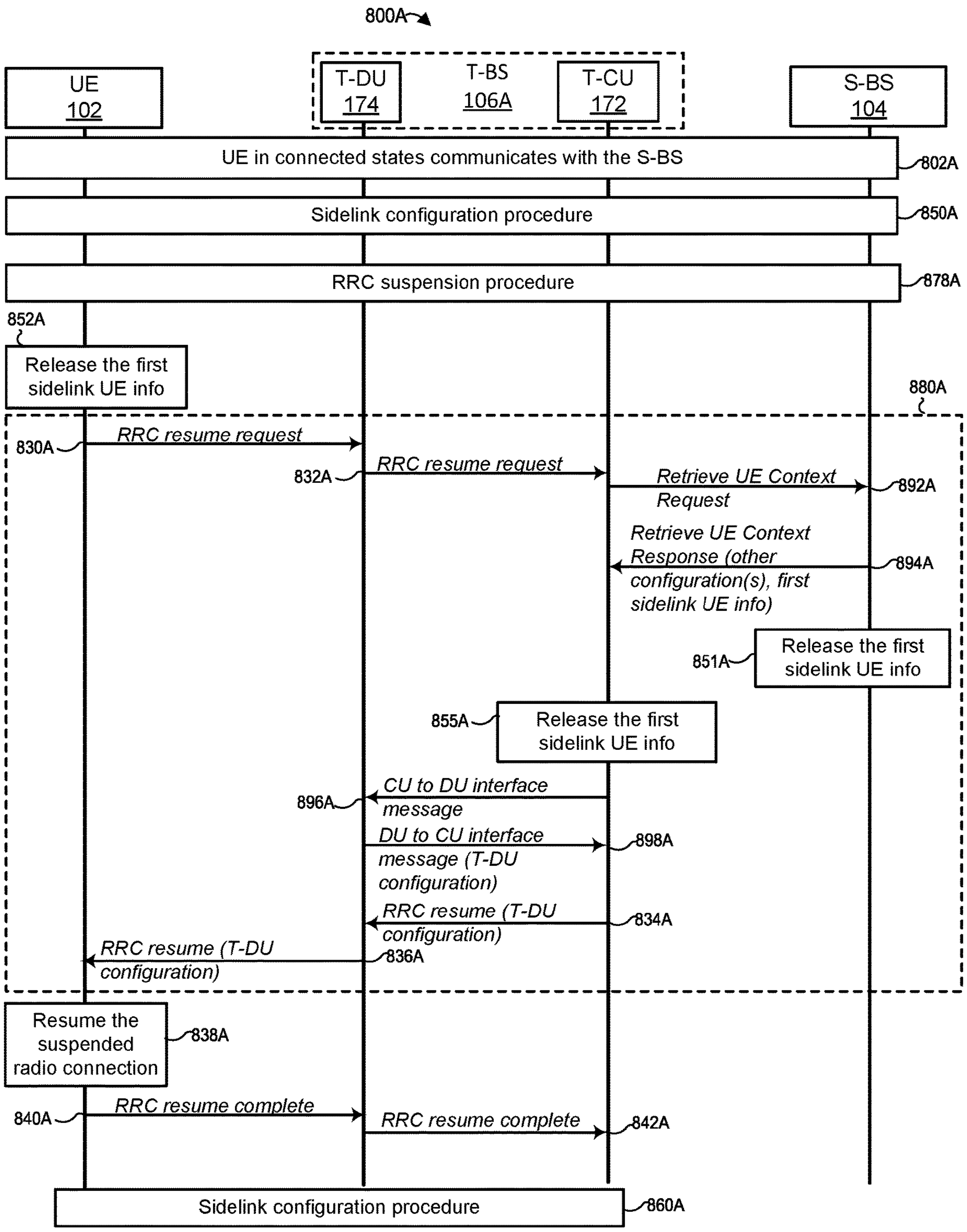
FIG. 8A is a messaging diagram of an example scenario in which a source base station forwards sidelink UE information of a UE to a target base station, which subsequently releases the sidelink UE information during an RRC resume procedure.
Figure 8B:
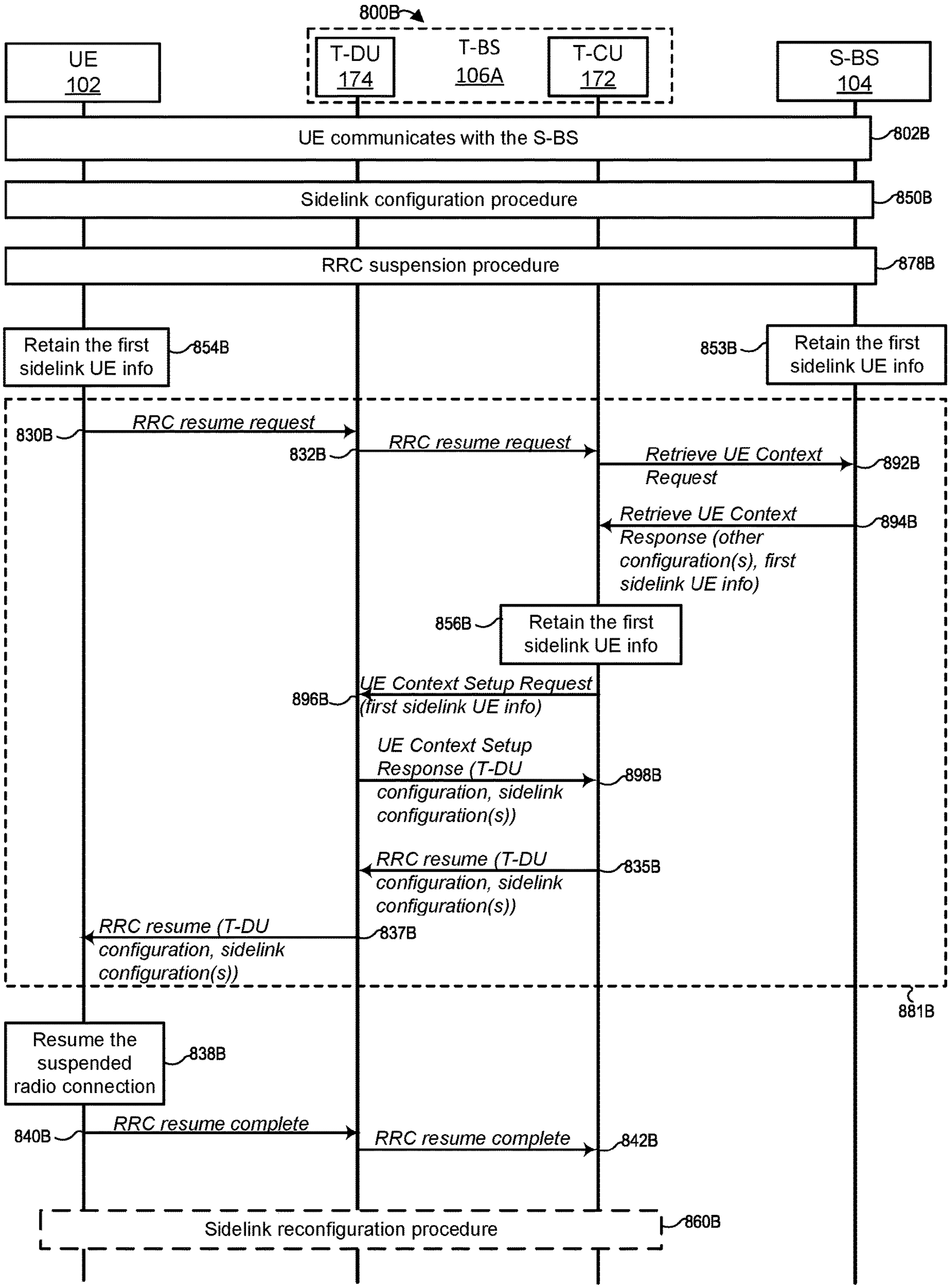
FIG. 8B is a messaging diagram of an example scenario in which a source base station forwards sidelink UE information of a UE to a target base station, which subsequently retains the sidelink UE information during an RRC resume procedure.

Now referring to FIGS. 3A-8B, the UE 102 generally provides sidelink UE information to a first node of RAN 105, and then the UE 102 or the RAN 105 initiates a process of connecting the UE 102 to a different, second node of the RAN 105. Before, during, or after the process, the UE 102 and/or the RAN 105 can either release or retain the sidelink UE information. Particularly, in FIGS. 3A-3B, the UE 102 provides sidelink UE information to a CU via a source DU of a distributed base station, the UE 102 initiates a process of connecting to a target DU of the distributed base station, and the UE 102 and/or the CU can either release or retain the sidelink UE information. In FIGS. 4A-4B, the UE 102 provides sidelink UE information to a source base station, the UE 102 initiates a process of connecting to a target DU of a target distributed base station, and the UE 102 and/or the target CU of the target distributed base station can either release or retain the sidelink UE information. In FIG. 5, the UE 102 in DC with a CU via a master DU and a secondary DU of a distributed base station provides sidelink UE information to the master DU, the UE 102 initiates a process of notifying the secondary DU of a communication failure with the master DU, and the UE 102 and/or the CU can either release or retain the sidelink UE information. In FIG. 6, the UE 102 in DC with an MN and an SN provides sidelink UE information to the MN, the UE 102 initiates a process of notifying the SN of a communication failure with the MN, and the UE 102 and/or the MN can either release or retain the sidelink UE information. In FIGS. 7A-7B, the UE 102 provides sidelink UE information to a CU via a source DU of a distributed base station, the CU initiates a process of suspending a radio connection with the UE 102, and the UE 102 and/or the CU can either release or retain the sidelink UE information. In FIGS. 8A-8B, the UE 102 provides sidelink UE information to a source base station, the source base station initiates a process of suspending a radio connection with the UE 102, the UE 102 attempts to resume a radio connection with a target DU of a target distributed base station, and the UE 102 and/or the target CU of the target distributed base station can either release or retain the sidelink UE information.

Referring first to a scenario 300A of FIG. 3A, the base station 106A includes a source DU (S-DU) 174A, a target DU (T-DU) 174B, and a CU 172. Initially, the UE 102 communicates 302A with the CU 172 via the S-DU 174A, e.g., on cell 125A. In some implementations, the UE 102 is in single connectivity (SC) with the base station 106A. In other implementations, the UE 102 is in dual connectivity (DC) with base 106A and base station 104 (not shown in FIG. 3A), where the base station 106A can operate as an MN or SN and the base station 104 can operate as the corresponding SN or MN.

The UE 102, at some point e.g., when interested in performing sidelink communication with another UE (e.g., UE 103), transmits 304A UE information relevant to sidelink communication (i.e., first sidelink UE information) to the S-DU 174A, to indicate that the UE 102 is interested in sidelink communication on one or more frequencies, request sidelink resources for the sidelink communication, and/or report quality of service (QoS) information for one or more destinations or sidelink radio bearer(s) for the sidelink communication. In turn, the S-DU 174A transmits 306A the first sidelink UE information to the CU 172. The S-DU 174A in this case tunnels the first sidelink UE information to the CU 172 without processing this information because the S-DU 174A may not comprehend the first sidelink UE information in its current format. In some implementations, the S-DU 174A sends 306A a UL RRC Message Transfer message including the first sidelink UE information to the CU 172.

After receiving 306A the first sidelink UE information, the CU 172 processes the first sidelink UE information to be in a format recognizable by the S-DU 174A, by including the first sidelink UE information in a CU to DU interface message. The CU 172 then transmits 308A the CU to DU interface message including the first sidelink UE information to the S-DU 174A. In response, the S-DU 174A transmits 310A a DU to CU interface message to the CU 172. In some implementations, the S-DU 174A generates first sidelink configuration(s) for the UE 102 according to (e.g., based on, considering, or in response to) the first sidelink UE information, and includes the first sidelink configuration(s) in the DU to CU interface message. Alternatively, the S-DU 174A omits sidelink configuration(s) in the DU to CU interface message. The events 308A and 310A are collectively referred to in FIG. 3A as a DU sidelink reconfiguration procedure 374A.

In some implementations, the UE 102 transmits 304A the first sidelink UE information in an RRC message to the S-DU 174A, and the CU 172 may include the RRC message in the CU to DU interface message described above. The RRC message can be a EUTRA RRC message or an NR RRC message. For example, the RRC message can be a SidelinkUEInformation message or a SidelinkUEInformationNR message conforming to 3GPP specification 36.331 or 38.331. If the base station 106A is a gNB and the RRC message is a EUTRA RRC message, the UE 102 can transmit 304A an NR RRC container message (e.g., a ULInformationTransferIRAT message) including the EUTRA RRC message to the CU 172 via the S-DU 174A. In turn, the CU 172 extracts the EUTRA RRC message from the NR RRC container message.

In some implementations, the CU to DU interface message is a UE Context Modification Request message, and the DU to CU interface message is a UE Context Modification Response message responding to the UE Context Modification Request message. In other implementations, the DU to CU message is a UE Context Modification Required message, and the CU 172 then can send a UE Context Modification Confirm message to the S-DU 174A in response. In this case, the CU to DU interface message can be a UE Context Modification Request message and the S-DU 174A can send the UE Context Modification Response message excluding the first sidelink configuration(s) to the CU 172 in response.

In some implementations, the S-DU 174A can generate non-sidelink configuration parameter(s) for the UE 102 to communicate with the S-DU 174A according to (e.g., based on or considering) the first sidelink UE information received at event 308A, include non-sidelink configuration(s) corresponding to the non-sidelink configuration parameter(s) in an S-DU configuration, and transmit 310A the S-DU configuration to the CU 172 in the DU to CU interface message. The S-DU configuration can be a CellGroupConfig IE or include configurations in the CellGroupConfig IE.

After receiving 310A the first sidelink configuration(s) and/or the S-DU configuration, the CU 172 can perform 376A an RRC procedure (e.g., an RRC reconfiguration procedure) to send the first sidelink configuration(s) and/or the S-DU configuration to the UE 102. The events 304A, 306A, 308A, 310A, and 376A are collectively referred to in FIG. 3A as a sidelink configuration procedure 350A. In one implementation of the RRC procedure, the CU 172 sends an RRC message including the first sidelink configuration(s) and/or the S-DU configuration to the S-DU 174A, which in turn transmits the RRC message to the UE 102. In some implementations, the UE 102 can transmit an RRC response message to the S-DU 174A, which in turn sends the RRC response message to the CU 172. In some implementations, the RRC message and the RRC response message can be an RRCReconfiguration message and an RRCReconfigurationComplete message, respectively. In other implementations, the RRC message and the RRC response message can be an RRCConnectionReconfiguration message and an RRCConnectionReconfigurationComplete message, respectively.

If the UE 102 receives the first sidelink configuration(s) in the RRC procedure at event 376A, the UE 102 can use the first sidelink configuration(s) to perform sidelink communication with the UE 103. Otherwise, the UE 102 can perform sidelink communication with the UE 103 by using default sidelink configuration(s) that are not based on the first sidelink UE information, such as common or preconfigured sidelink configuration(s) as described below.

During or after performing 376A the RRC procedure, the UE 102 detects 378A failure on a radio connection with the S-DU 174A and/or the CU 172. The failure can be a failure of the radio connection (i.e., a radio link failure), or, as a result of performing 376A an RRC reconfiguration procedure, a handover failure, integrity check failure, or other suitable reconfiguration failure. In response to detecting 378A the failure, the UE 102 releases 352A the first sidelink UE information and performs an RRC reestablishment procedure with the T-DU 174B and/or the CU 172 to recover from the failure. In other implementations, the UE 102 can release 352A the first sidelink UE information in response to (or while) performing the RRC reestablishment procedure.

In one implementation of the RRC reestablishment procedure, the UE 102 transmits 330A an RRC reestablishment request message to the T-DU 174B (e.g., on cell 126A), which in turn sends 332A the RRC reestablishment request message to the CU 172. In some implementations, the RRC reestablishment request message indicates the failure detected at event 378A. After receiving the RRC reestablishment request message, the CU 172 can release 351A the first sidelink UE information that the CU 172 received in event 306A. After receiving the RRC reestablishment request message, the CU 172 sends 334A an RRC reestablishment message to the T-DU 174B, which in turn transmits 336A the RRC reestablishment message to the UE 102. In some implementations, the CU 172 sends 334A a DL RRC Message Transfer message including the RRC reestablishment message to the T-DU 174B. As a result, the UE 102 recovers from the failure in response to the RRC reestablishment message. The UE 102 can transmit 340A an RRC reestablishment complete message to the T-DU 174B, which in turn can send 342A the RRC reestablishment complete message to the CU 172. In some implementations, the T-DU 174B sends 342A a UL RRC Message Transfer message including the RRC reestablishment complete message to the CU 172.

In some implementations, after receiving 332A the RRC reestablishment request message, the CU 172 can perform 390A a UE Context procedure with the T-DU 174B to obtain a T-DU configuration from the T-DU 174B. The T-DU configuration can be a CellGroupConfig IE or include configurations in the CellGroupConfig IE. In some implementation, the UE Context procedure is a UE Context Setup procedure or a UE Context Modification procedure. The CU 172 sends a UE Context Setup Request message to T-DU 174B to perform the UE Context Setup procedure, and the T-DU 174B sends a UE Context Setup Response message including the T-DU configuration in response. In the UE Context Modification procedure, the CU 172 sends a UE Context Modification Request message to T-DU 174B to perform the UE Context Modification procedure, and the T-DU 174B sends a UE Context Modification Response message including the T-DU configuration in response.

After performing 390A the UE Context procedure, the CU 172 performs 380A an RRC reconfiguration procedure with the UE 102 via the T-DU 174B to send the T-DU configuration to the UE 102. To perform the RRC reconfiguration procedure, the CU 172 sends an RRC reconfiguration message including the T-DU configuration to the T-DU 174B, which in turn transmits the RRC reconfiguration message to the UE 102. In response, the UE 102 transmits an RRC reconfiguration complete message to the T-DU 174B, which in turn sends the RRC reconfiguration complete message to the CU 172. As a result, the UE 102 can communicate with the T-DU 174B using the T-DU configuration. In some implementations, the CU 172 sends a DL RRC Message Transfer message including the RRC reconfiguration message to the T-DU 174B and, the T-DU 174B sends a UL RRC Message Transfer message including the RRC reconfiguration complete message to the CU 172. In some implementations, the RRC reconfiguration message and RRC reconfiguration complete are RRCReconfiguration message and RRCReconfigurationComplete message, respectively. In some implementations, the RRC reconfiguration message may omit a mobility IE (e.g., ReconfigurationWithSync or a MobilityControlInfo) indicating handover or PSCell change.

In some implementations, the CU 172 can perform the UE Context procedure before or after transmitting 334A the RRC reestablishment message. Thus, in the RRC reconfiguration procedure 380A, the CU 172 can transmit the RRC reconfiguration message after transmitting the RRC reestablishment message, after receiving the RRC reestablishment complete message, or before receiving the RRC reestablishment complete message. In other implementations, the CU 172 can perform the UE Context procedure after receiving 342A the RRC reestablishment complete message. Thus, in the RRC reconfiguration procedure 380A, the CU 172 can transmit the RRC reconfiguration message after receiving the RRC reestablishment complete message.

Although the UE 102 is described as performing the RRC reestablishment procedure (e.g., in events 330A, 332A, 334A, 336A, 340A, 342A) with the T-DU 174B and/or CU 172, in other implementations, the UE 102 can alternatively perform the RRC reestablishment procedure with the S-DU 174A. In such implementations, the CU 172 performs 380A the RRC reconfiguration procedure with the S-DU 174A to send an S-DU configuration of the S-DU 174A to the UE 102, similar to the manner in which the CU 172 sends the T-DU configuration to the UE 102. The CU 172 may optionally perform the UE Context procedure with the S-DU 174A.

In some implementations, after performing 380A the RRC reconfiguration procedure, the UE 102 can perform 360A a sidelink configuration procedure with the CU 172 via the T-DU 174B, similar to the manner in which the UE 102 performs 350A the sidelink configuration procedure with the CU 172 via the S-DU 174A, if the UE 102 is still interested in providing sidelink UE information to the CU 172 to perform sidelink communication with the UE 103. Otherwise, if the UE 102 is no longer interested in providing sidelink UE information to the CU 172 to perform sidelink communication with the UE 103, the UE 102 does not perform 360A the sidelink configuration procedure. In the sidelink configuration procedure 360A, the UE 102 can send second sidelink UE information to the CU 172 via the T-DU 174B, similar to events 304A, 306A. The CU 172 receives the second sidelink UE information and obtains second sidelink configuration(s) and/or second non-sidelink configuration(s) from the T-DU 174B in a DU sidelink reconfiguration procedure, similar to the DU sidelink reconfiguration 374A. Then the CU 172 sends the second sidelink configuration(s) and/or the second non-sidelink configuration(s) to the UE 102 in an RRC procedure similar to the RRC procedure 376A. Then the UE 102 can use the second sidelink configuration(s) and/or the second non-sidelink configuration(s) to perform sidelink communication with the UE 103.

In implementations in which the UE 102 performs 380A the RRC reestablishment procedure with the S-DU 174A instead of with the T-DU 174B, the UE 102 can perform 360A the sidelink configuration procedure with the CU 172 via the S-DU 174A, similar to the manner in which the UE 102 performs 360A the sidelink configuration procedure with the CU 172 via the T-DU 174B, if the UE 102 is still interested in providing sidelink UE information to the CU 172 to perform sidelink communication with the UE 103.

In some implementations, in addition to releasing the first sidelink UE information at event 352A, the UE 102 can release some of the non-sidelink configuration(s) (e.g., that are relevant to uplink and/or downlink communication) received during the RRC procedure at event 376A, and retain the remainder of the non-sidelink configuration(s) in response to detecting the failure. For example, the UE 102 can release first non-sidelink configuration(s) (e.g., spCell-Config, SCell configuration(s), SCG configuration, SRB3 configuration, and/or Release-16 configuration(s) defined in 3GPP specification 38.331 or 36.331 v16.1.0 or onwards) and retain second non-sidelink configuration(s) (e.g., SRB configuration(s) for SRB1 and/or SRB2, DRB configuration(s), measurement configuration(s), and/or configuration(s) in CellGroupConfig IE for MCG). Similarly, the CU 172 can also release the first non-sidelink configuration(s) and retain the second non-sidelink configuration(s) in response to receiving 332A the RRC reestablishment request message. Thus, the UE 102 and the CU 172 do not use the released non-sidelink configuration(s) to communicate with each other. The UE 102 and the CU 172 and/or T-DU 174B can suspend using the retained non-sidelink configuration(s) until after recovering from the failure or after transmitting or receiving an RRC reconfiguration message in the RRC reconfiguration procedure at event 380A. In some implementations, the UE 102 and the CU 172 and/or T-DU 174B may update the retained non-sidelink configuration(s) according to an RRC reconfiguration message in the RRC reconfiguration procedure 380A, and subsequently use the updated non-sidelink configuration(s) after recovering from the failure or after transmitting or receiving the RRC reconfiguration message in the RRC reconfiguration procedure 380A.

In one implementation, in response to detecting 378A the failure, the UE 102 can release the first sidelink configuration(s) received in event 376A. In another implementation, the UE 102 can retain the first sidelink configuration(s) in response to detecting 378A the failure. In either of these implementations, and before obtaining the second sidelink configuration(s) in the sidelink configuration procedure 360A, the UE 102 can perform sidelink communication with the UE 103 by using common, exceptional, or preconfigured sidelink configuration(s). In some implementations, the UE 102 can receive common sidelink configuration(s) in system information broadcast by the S-DU 174A (e.g., on cell 125A) or T-DU 174B (e.g., on cell 126A). The system information can include at least one system information block (SIB), e.g., which includes SIB12(s) defined in 3GPP specification 38.331 or includes SIB type 18, SIB type 21, and/or SIB type 26 defined in 3GPP specification 36.331. In some implementations, the UE 102 can receive, from the CU 172, exceptional sidelink configuration(s) in the RRC message in the RRC procedure 376A or in another RRC message in another suitable RRC procedure similar to the RRC procedure 376A. In some implementations, the UE 102 can obtain preconfigured sidelink configuration(s) from a Universal Subscriber Identity Module (USIM) included in the UE 102. In some implementations, a manufacturer of the UE 102 can provision preconfigured sidelink configuration(s) at the UE 102. In yet other implementations, the UE 102 receives an over-the-air (OTA) message including preconfigured sidelink configuration(s) from a server. The OTA message can be a short message, a device management message, a bearer independent protocol (BIP) message, or Internet Protocol (IP) packet(s).

In some implementations, the non-sidelink configuration parameter(s) described above may reduce the chances of collision of the sidelink communication from uplink communication or downlink communication for the UE 102. For example, the uplink communication includes physical uplink shared channel (PUSCH) transmissions, physical uplink control channel (PUCCH), transmisisons of channel state information (CSI), and/or transmissions of sounding reference signal(s). In another example, the downlink communication includes physical downlink shared channel (PDSCH) transmissions, physical downlink control channel (PDCCH), and/or transmissions of reference signal(s) (e.g., CSI-RS). In other implementations, the non-sidelink configuration parameter(s) may include a discontinous reception (DRX) configuration which directs the sidelink communication (i.e., sidelink transmissions or receptions) to occur at off-durations in DRX cycles configured by the DRX configuration. In yet other implementations, the non-sidelink configuration parameter(s) may include a measurement gap configuration which enables the sidelink communication to occur at slots in gaps configured by the measurement gap configuration. In yet other implementations, the non-sidelink configuration parameter(s) may include a measurement gap configuration which enables the sidelink communication to occur at slots not in gaps configured by the measurement gap configuration. In some implementations, the non-sidelink configuration parameter(s) may configure the uplink communication and sidelink communication on the same carrier frequency or different carrier frequencies. In some implementations, the non-sidelink configuration parameter(s) may configure the uplink communication and sidelink communication on the same bandwidth part (BWP) or different BWPs.

In the implementations described above, the UE 102 transmits sidelink UE information (i.e., the first sidelink UE information or the second sidelink UE information) to the RAN 105 to indicate that the UE 102 is interested in sidelink communication on one or more frequencies, request sidelink resources for the sidelink communication, and/or report QoS information for one or more destinations or sidelink radio bearer(s) in the sidelink communication. The first sidelink UE information can be the same as or similar to the second sidelink UE information described above. For example, the sidelink UE information can include frequency information indicating at least one carrier frequency on which the UE 102 prefers to transmit V2X sidelink communication (e.g., sidelink packets). In another example, the sidelink UE information can include frequency information of at least one carrier frequency on which the UE 103 is interested in receiving V2X sidelink communication (e.g., sidelink packets). In such a case, the carrier frequency information of the UE 102 and the carrier frequency information of the UE 103 should indicate the same carrier frequency over which the UE 102 can perform sidelink communication with the UE 103. In yet another example, the sidelink UE information can include at least one destination identity. In still another example, the sidelink UE information can include UE capabilities for sidelink communication. Further, the sidelink UE information can indicate RLC mode(s) for sidelink radio bearer(s). The sidelink UE information also can include synchronization reference(s).

In some implementations, the UE 102 may include first sidelink transmission resources request information (e.g., first SL-TxResoureReq) in the first sidelink UE information, and similarly include second sidelink transmission resources request information (e.g., second SL-TxResoureReq) in the second sidelink UE information. The S-DU 174A may generate the first sidelink configuration(s) according to the first sidelink transmission resources request information, and similarly the T-DU 174B may generate the second sidelink configuration(s) according to the second sidelink transmission resources request information. In other implementations, the UE 102 may include first sidelink interested frequency information (e.g., first SL-RxInterestedFreqList) in the first sidelink UE information, and similarly include second sidelink interested frequency information (e.g., second SL-RxInterestedFreqList) in the second sidelink UE information. The S-DU 174A may generate the first sidelink configuration(s) according to the first sidelink interested frequency information, and similarly the T-DU 174B may generate the second sidelink configuration(s) according to the second sidelink interested frequency information.

In some implementations, the first or second sidelink configuration(s) can include configuration parameters for NR or EUTRA sidelink communication, e.g., even if the base station 106A is a gNB. In some implementations, the first or second sidelink configuration(s) include configuration parameters in an SL-PHY-MAC-RLC-Config IE (e.g., SL-PHY-MAC-RLC-Config-r16 IE) conforming to 3GPP specification 38.331. In other implementations, the first or second sidelink configuration(s) include configuration parameters in an SL-ConfigDedicatedEUTRA-Info IE (e.g., SL-ConfigDedicatedEUTRA-Info-r16 IE) conforming to 3GPP specification 38.331. In some implementations, the first sidelink configuration(s) can be a first SL-PHY-MAC-RLC-Config IE (e.g., SL-PHY-MAC-RLC-Config-r16 IE) conforming to 3GPP specification 38.331 or a first SL-ConfigDedicatedEUTRA-Info IE (e.g., SL-ConfigDedicatedEUTRA-Info-r16 IE) conforming to 3GPP specification 38.331, and the second sidelink configuration(s) can be a second SL-PHY-MAC-RLC-Config IE (e.g., SL-PHY-MAC-RLC-Config-r16 IE) conforming to 3GPP specification 38.331 or a second SL-ConfigDedicatedEUTRA-Info IE (e.g., SL-ConfigDedicatedEUTRA-Info-r16 IE) conforming to 3GPP specification 38.331.

In some implementations, the SL-ConfigDedicatedEUTRA-Info IE may include an RRCConnectionReconfiguration message conforming to 3GPP LTE specification 36.331. In some implementations, the SL-ConfigDedicatedEUTRA-Info IE may include one or more SL-TimeOffsetEUTRA-r16 IEs (e.g., SL-TimeOffsetEUTRA-r16 IE) conforming to 3GPP NR specification 38.331. For example, the SL-ConfigDedicatedEUTRA-Info IE may include a sl-TimeOffsetEUTRA-List-r16 field including the one or more TimeOffsetEUTRA-r16 IEs.

In some implementations, the S-DU 174A generates the first sidelink configuration(s) for EUTRA sidelink communication, if the first sidelink UE information is for EUTRA or the S-DU 174A receives a EUTRA RRC message including the first sidelink UE information in the CU to DU interface message at event 308A. In other implementations, the S-DU 174A generates the first sidelink configuration(s) for NR sidelink communication, if the first sidelink UE information is for NR or the S-DU 174A receives an NR RRC message including the first sidelink UE information in the CU to DU interface message at event 308A.

In some implementations, the T-DU 174B generates the second sidelink configuration(s) for EUTRA sidelink communication, if the second sidelink UE information is for EUTRA or the T-DU 174B receives a EUTRA RRC message including the second sidelink UE information in the CU to DU interface message at event 360A. In other implementations, the T-DU 174B generates the second sidelink configuration(s) for NR sidelink communication, if the second sidelink UE information is for NR or the T-DU 174B receives an NR RRC message including the second sidelink UE information in the CU to DU interface message at event 360A.

Now referring to FIG. 3B, whereas the UE 102 and the CU 172 of FIG. 3A each release the first sidelink UE information, the UE 102 and the CU 172 of FIG. 3B each retain the first sidelink UE information, and later the UE 102 can provide second sidelink UE information to the CU 172 to override the first sidelink UE information retained at the CU 172. Otherwise, any of the implementations described above in reference to FIG. 3A can be applied to scenario 300B of FIG. 3B.

Similar to scenario 300A, in scenario 300B, the UE 102 initially communicates 302B with the CU 172 via S-DU 174A, e.g., on cell 125A, similar to event 302A. The UE 102 then performs 350B a sidelink configuration procedure with the S-DU 174A and CU 172, similar to the sidelink configuration procedure 350A. Thus, the UE 102 provides first sidelink UE information to the base station 106A, which in turn provides first sidelink configuration(s) and/or an S-DU configuration to the UE 102.

During or after performing 350B the sidelink configuration procedure, the UE 102 detects 378B failure on a radio connection with the S-DU 174A and/or the CU 172, similar to event 378A. In response to detecting 378B the failure, and in contrast to event 352A, the UE 102 retains 354B the first sidelink UE information. In some implementations, the UE 102 retains the first sidelink configuration(s) in response to detecting 378B the failure. Then the UE 102 proceeds to perform an RRC reestablishment procedure with the T-DU 174B and/or the CU 172, by transmitting 330B an RRC reestablishment request message to the T-DU 174B (e.g., on cell 126A), which in turn sends 332B the RRC reestablishment request message to the CU 172, similar to events 330A and 332A. In some implementations, the RRC reestablishment request message indicates the failure detected at event 378B. After receiving the RRC reestablishment request message, in contrast to event 351A, the CU 172 retains 353B the first sidelink UE information that the CU 172 received in event 350B. In some implementations, the CU 172 retains the first sidelink configuration(s) in response to receiving the RRC reestablishment request message. After receiving the RRC reestablishment request message, the CU 172 sends 334B an RRC reestablishment message to the T-DU 174B, which in turn transmits 336B the RRC reestablishment message to the UE 102, similar to events 334A and 336A, respectively. As a result, the UE 102 recovers from the failure in response to the RRC reestablishment message. The UE 102 can transmit 340B an RRC reestablishment complete message to the T-DU 174B, which in turn can send 342B the RRC reestablishment complete message to the CU 172, similar to events 340A and 342A, respectively.

In some implementations, after receiving 332B the RRC reestablishment request message, the CU 172 can perform 390B a UE Context procedure with the T-DU 174B to obtain a T-DU configuration from the T-DU 174B, similar to event 390A. After performing 390B the UE Context procedure, the CU 172 performs 380B an RRC reconfiguration procedure with the UE 102 via the T-DU 174B to send the T-DU configuration to the UE 102, similar to event 380A. As a result, the UE 102 can communicate with the T-DU 174B using the T-DU configuration.

In some implementations, after performing 380B the RRC reconfiguration procedure, the UE 102 can perform 360B a sidelink configuration procedure with the CU 172 via the T-DU 174B, similar to event 360A, if the UE 102 is still interested in providing sidelink UE information to the CU 172 to perform sidelink communication with the UE 103. Otherwise, if the UE 102 is no longer interested in providing sidelink UE information to perform sidelink communication with the UE 103, the UE 102 does not perform 360B the sidelink configuration procedure. In the sidelink configuration procedure 360B, the UE 102 can send 344B second sidelink UE information to the T-DU 174B, which in turn sends 346B the second sidelink UE information to the CU 172. The CU 172 can update the first sidelink UE information retained by the CU 172 at event 353B in accordance with the second sidelink UE information. After receiving the second sidelink UE information, the CU 172 processes the second sidelink UE information to be in a format recognizable by the T-DU 174B, by including the second sidelink UE information in a CU to DU interface message. The CU 172 then transmits 362B the CU to DU interface message including the second sidelink UE information to the T-DU 174B. In response, the T-DU 174B generates second sidelink configuration(s) and/or second non-sidelink configuration(s) for the UE 102 according to (e.g., based on, considering, or in response to) the second sidelink UE information, and transmits 366B a DU to CU interface message that includes the second sidelink configuration(s) and/or second non-sidelink configuration(s) to the CU 172. Then the CU 172 sends the second sidelink configuration(s) and/or second non-sidelink configuration(s) to the UE 102 via the T-DU 174B in an RRC procedure 388B similar to the RRC procedure 376A. Upon receiving the second sidelink configuration(s), the UE 102 updates the first sidelink configuration(s) received at event 350B with the second sidelink configuration(s). Then the UE 102 can use the second sidelink configuration(s) to perform sidelink communication with the UE 103. Upon receiving the second non-sidelink configuration(s), the UE 102 updates the first non-sidelink configuration(s) received at event 350B with the second non-sidelink configuration(s). Then the UE 102 can use the second sidelink configuration(s) and/or non-sidelink configuration(s) to communicate with the T-DU 174B.

Depending on the second sidelink UE information, the T-DU 174B may generate different second sidelink configuration(s) or second non-sidelink configuration(s) which include non-sidelink configuration parameter(s) described for FIG. 3A. For example, if the second sidelink UE information indicates to release sidelink communication, the T-DU 174B can release the first sidelink configuration(s) in the second sidelink configuration(s) or generate the second non-side configuration(s) without considering potential collision of the sidelink communication from uplink communication or downlink communication. In another example, if the first sidelink UE information includes first sidelink transmission resources request information (e.g., first SL-TxResoureReq) and the second sidelink UE information includes second sidelink transmission resources request information (e.g., second SL-TxResoureReq) to update the first sidelink transmission resources request information, the T-DU 174B can generate the second sidelink configuration(s) or the second non-sidelink configuration(s) according to the second sidelink transmission resources request information. In some implementations, the second non-sidelink configuration parameter(s) described above may consider reducing the chances of potential collision of the sidelink communication from uplink communication or downlink communication for the UE 102, as described for FIG. 3A. In yet another example, if the first sidelink UE information includes first sidelink interested frequency information (e.g., first SL-RxInterestedFreqList) and the second sidelink UE information includes second sidelink interested frequency information (e.g., second SL-RxInterestedFreqList) to update first sidelink interested frequency information, the T-DU 174B can generate the second sidelink configuration(s) or the second non-sidelink configuration(s) according to the second sidelink interested frequency information. The T-DU 174B may configure the UE 102 to perform communication with the T-DU 174B on a carrier frequency in the second sidelink interested frequency information.

Now referring to FIG. 4A, whereas the UE 102 of FIG. 3A, after detecting a failure with the S-DU of a base station, can reestablish a radio connection with a T-DU of the same base station, the UE 102 of FIG. 4A reestablishes a radio connection with another base station. Otherwise, any of the implementations described above in reference to FIG. 3A can be applied to scenario 400A of FIG. 4A.

Similar to scenario 300A, in scenario 400A of FIG. 4A, the UE 102 initially communicates 402A with the S-BS 104, e.g., on cell 124. The UE 102 then performs 450A a sidelink configuration procedure with the S-BS 104, similar to the sidelink configuration procedure 350A. Thus, the UE 102 provides first sidelink UE information to the S-BS 104, which in turn provides first sidelink configuration(s) to the UE 102.

During or after performing 450A the sidelink configuration procedure, the UE 102 detects 478A failure on a radio connection with the S-BS 104, similar to event 378A. In response to detecting 478A the failure, the UE 102 releases 452A the first sidelink UE information, similar to event 352A. In some implementations, the UE 102 releases the first sidelink configuration(s) in response to detecting 478A the failure. In other implementations, the UE 102 can release 452A the first sidelink UE information and/or the first sidelink configuration(s) in response to (or while) performing an RRC reestablishment procedure described below, to recover from the failure. Then the UE 102 performs the RRC reestablishment procedure with a T-BS 106A, by transmitting 430A an RRC reestablishment request message to a T-DU 174 of the T-BS 106A (e.g., on cell 126A), which in turn sends 432A the RRC reestablishment request message to the T-CU 172 of T-BS 106A, similar to events 330A and 332A. In some implementations, the RRC reestablishment request message indicates the failure detected at event 478A. After receiving the RRC reestablishment request message, the T-CU 172 then transmits 492A a Retrieve UE Context Request message to the S-BS 104. In response, the S-BS 104 transmits 494A a Retrieve UE Context Response message including the first sidelink UE information retained by the S-BS 104 at event 450A to the T-CU 172. In some implementations, the S-BS 104 can include other configurations (e.g., an S-BS configuration for the UE 102 to communicate via uplink and/or downlink with the S-B S 104) for the UE 102 in the Retrieve UE Context Response message. In some implementations, the S-BS 104 can release 451A the first sidelink UE information after transmitting the first sidelink UE information at event 494A.

In response to receiving 432A the RRC reestablishment request message or the first sidelink UE information in event 494A, the T-CU 172 releases 455A the first sidelink UE information. After releasing 455A the first sidelink UE information, the T-CU 172 transmits 434A the RRC reestablishment message to the T-DU 174, which in turn transmits 436A the RRC reestablishment message to the UE 102, similar to events 334A and 336A, respectively. As a result, the UE 102 recovers from the failure in response to the RRC reestablishment message. The UE 102 can transmit 440A an RRC reestablishment complete message to the T-DU 174, which in turn can send 442A the RRC reestablishment complete message to the T-CU 172, similar to events 340A and 342A, respectively.

In some implementations, after receiving the Retrieve UE Context Response message or the RRC reestablishment complete message at events 494A and 442A, respectively, the T-CU 172 can perform 490A a UE Context procedure with the T-DU 174 to obtain a T-DU configuration from the T-DU 174, similar to event 390A. After performing 490A the UE Context procedure, the T-CU 172 performs 480A an RRC reconfiguration procedure with the UE 102 via the T-DU 174 to send the T-DU configuration to the UE 102, similar to event 380A.

In some implementations, after performing 480A the RRC reconfiguration procedure, the UE 102 can perform 460A a sidelink configuration procedure with the T-CU 172 via the T-DU 174, similar to event 360A, if the UE 102 is still interested in providing sidelink UE information to the T-CU 172 to perform sidelink communication with the UE 103. Thus, the UE 102 can send second sidelink UE information to the T-BS 106A (e.g., the T-DU 174). In turn, the T-BS 106A (e.g., the T-CU 172 via the T-DU 174) can send second sidelink configuration(s) to the UE 102. Then the UE 102 can use the second sidelink configuration(s) to perform sidelink communication with the UE 103. Otherwise, if the UE 102 is no longer interested in providing sidelink UE information to perform sidelink communication with the UE 103, the UE 102 does not perform 460A the sidelink configuration procedure.

Now referring to FIG. 4B, whereas the UE 102 of FIG. 3B, after detecting a failure with the S-DU of a base station, can reestablish a radio connection with a T-DU of the same base station, the UE 102 of FIG. 4B reestablishes a radio connection with another base station. Otherwise, any of the implementations described above in reference to FIG. 3B can be applied to scenario 400B of FIG. 4B.

Similar to scenario 300B, in scenario 400B of FIG. 4B, the UE 102 initially communicates 402B with the S-BS 104, e.g., on cell 124. The UE 102 then performs 450B a sidelink configuration procedure with the S-BS 104, similar to the sidelink configuration procedure 350B. Thus, the UE 102 provides first sidelink UE information to the S-BS 104, which in turn provides first sidelink configuration(s) to the UE 102.

During or after performing 450B the sidelink configuration procedure, the UE 102 detects 478B failure on a radio connection with the S-BS 104, similar to event 378B. In response to detecting 478B the failure, the UE 102 retains 454B the first sidelink UE information, similar to event 354B. In some implementations, the UE 102 retains the first sidelink configuration(s) in response to detecting 478B the failure. Then the UE 102 proceeds to perform an RRC reestablishment procedure with a T-BS 106A, by transmitting 430B an RRC reestablishment request message to a T-DU 174 of the T-BS 106A (e.g., on cell 126A), which in turn sends 432B the RRC reestablishment request message to the T-CU 172 of T-BS 106A, similar to events 330B and 332B. In some implementations, the RRC reestablishment request message indicates the failure detected at event 478B. After receiving the RRC reestablishment request message, the T-CU 172 then transmits 492B a Retrieve UE Context Request message to the S-BS 104. In response, the S-BS 104 transmits 494B a Retrieve UE Context Response message including the first sidelink UE information retained by the S-BS 104 at event 450B to the T-CU 172. In turn, the T-CU 172 can retain 453B the first sidelink UE information, similar to event 353B. In some implementations, the S-BS 104 can include other configurations (e.g., an S-BS configuration for the UE 102 to communicate via uplink and/or downlink with the S-BS 104) for the UE 102 in the Retrieve UE Context Response message.

In response to receiving 432B the RRC reestablishment request message, the T-CU 172 transmits 434B the RRC reestablishment message to the T-DU 174, which in turn transmits 436B the RRC reestablishment message to the UE 102, similar to events 334B and 336B, respectively. As a result, the UE 102 recovers from the failure in response to the RRC reestablishment message. The UE 102 can transmit 440B an RRC reestablishment complete message to the T-DU 174, which in turn can send 442B the RRC reestablishment complete message to the T-CU 172, similar to events 340B and 342B, respectively.

In some implementations, after receiving the Retrieve UE Context Response message or the RRC reestablishment complete message at events 494B and 442B, respectively, the T-CU 172 can perform 474B a DU sidelink reconfiguration procedure with the T-DU 174, so that the T-DU 174 recognizes the first sidelink UE information, similar to event 374A. After performing 474B the DU sidelink reconfiguration procedure, the T-CU 172 performs 480B an RRC reconfiguration procedure with the UE 102 via the T-DU 174 to send a T-DU configuration to the UE 102, similar to event 380B. As a result, the UE 102 can communicate with the T-DU 174 using the T-DU configuration.

In some implementations, after performing 480B the RRC reconfiguration procedure, the UE 102 can perform 460B a sidelink configuration procedure with the T-CU 172 via the T-DU 174, similar to event 360B, if the UE 102 is still interested in providing sidelink UE information to the T-CU 172 to perform sidelink communication with the UE 103. Thus, the UE 102 can send second sidelink UE information to the T-BS 106A (e.g., the T-CU 172 via the T-DU 174) to update the first sidelink UE information retained by the T-CU 172 at event 453B. In turn, the T-BS 106A (e.g., the T-CU 172 via the T-DU 174) can send second sidelink configuration(s) to the UE 102 for the UE 102 to update the first sidelink configuration(s) with the second sidelink configuration(s). Then the UE 102 can use the second sidelink configuration(s) to perform sidelink communication with the UE 103. Otherwise, if the UE 102 is no longer interested in providing sidelink UE information to perform sidelink communication with the UE 103, the UE 102 does not perform 460B the sidelink configuration procedure.

Next, FIG. 5 illustrates a scenario 500 in which the CU 172 initially communicates 502 with the UE 102 in DC. The base station 106A operates as both an MN and an SN, with the MN including a CU (e.g., the CU 172) and a first DU (e.g., a DU 174A of the one or more DUs 174, referred to herein as a master DU (M-DU) 174A) of the base station 106A, and the SN including the same CU and a second, different DU (e.g., a DU 174B of the one or more DUs 174, referred to herein as a secondary DU (S-DU) 174B) of the base station 106A. Events in the scenario 500 similar to those discussed previously with respect to the scenario 300B are labeled with similar reference numbers (e.g., with event 302B corresponding to event 502, event 350B corresponding to event 550).

Initially, the UE 102 communicates 502 in DC with the CU 172 via the M-DU 174A and the S-DU 174B. The UE 102 in DC then performs 550 a sidelink configuration procedure with the M-DU 174A and CU 172, similar to the sidelink configuration procedure 350B. Thus, the UE 102 provides first sidelink UE information to the CU 172, which in turn provides first sidelink configuration(s) to the UE 102 via the M-DU 174A. As similarly described for FIG. 3B, the CU 172 can also transmit a DU configuration (e.g., a M-DU configuration, S-DU configuration) to the UE 102 in the sidelink configuration procedure 550, in addition to the first sidelink configuration(s).

During or after performing 550 the sidelink configuration procedure, the UE 102 detects 578 failure on an MCG radio connection with the M-DU 174A, similar to event 378B. In response to detecting 578 the failure, the UE 102 retains 554 the first sidelink UE information, similar to event 354B. In some implementations, the UE 102 retains the first sidelink configuration(s) in response to detecting 578 the failure. In other implementations, in response to detecting 578 the failure, the UE 102 releases 552 the first sidelink UE information, similar to event 352A, and releases the first sidelink configuration(s).

After detecting 578 the MCG failure, the UE 102 can perform a fast MCG recovery procedure with the RAN 105. In one implementation of the fast MCG recovery procedure, the UE 102 suspends MCG transmissions (i.e., suspend transmissions on all of MCG link(s) with the M-DU 174A) and transmits 531 an MCG failure information message to the S-DU 174B, which in turn sends 533 the MCG failure information message to the CU 172. In some implementations, the MCG failure information message can indicate whether the UE 102 retained or released the first sidelink UE information at events 554 and 552, respectively. In turn, in response to receiving the MCG failure information message, the CU 172 can correspondingly retain 553 or release 551 the first sidelink UE information, and subsequently send 535 an MCG failure recovery message (e.g., MobilityFrom "source RAT" Command message, RRCConnectionReconfiguration message, RRCReconfiguration message, RRCConnectionRelease message, RRCRelease message) to the S-DU 174B, which in turn transmits 537 the MCG failure recovery message to the UE 102. The UE 102 can resume MCG transmissions in SC with the S-DU 174B (which now serves the UE 102 as a M-DU), or transition to the idle or inactive state according to the MCG failure recovery message.

In some implementations, after performing the fast MCG recovery procedure, the UE 102 can perform 560 a sidelink configuration procedure with the CU 172 via the S-DU 174B, similar to events 360A and 360B, if the UE 102 is still interested in providing sidelink UE information to the CU 172 to perform sidelink communication with the UE 103. Thus, the UE 102 can send second sidelink UE information to the base station 106A (e.g., the S-DU 174B). In turn, the base station 106A (e.g., the CU 172 via the S-DU 174B) can send second sidelink configuration(s) and/or second non-sidelink configuration(s) to the UE 102. Then the UE 102 can use the second sidelink configuration(s) to perform sidelink communication with the UE 103 and/or use the second non-sidelink configuration(s) to communicate with the base station 106A (e.g., the CU 172 via the S-DU 174B). Otherwise, if the UE 102 is no longer interested in providing sidelink UE information to perform sidelink communication with the UE 103 or the UE 102 is not capable of performing sidelink communication, the UE 102 does not perform 560 the sidelink configuration procedure.

In some implementations, the MCG failure recovery message can be a MobilityFrom "source RAT" Command message for inter-RAT handover to a target RAT. The source RAT is different from the target RAT. The CU 172 can prepare handover to a suitable cell of a target RAT for the UE 102 by obtaining a target handover command message for handover to the cell of the target RAT from a base station of the target RAT via a RAN interface (e.g., Xn) or a RAN-CN interface (e.g., S1 or NG). Then the CU 172 sends a MobilityFrom "source RAT" Command message including the target handover command message to the S-DU 174B, which in turn transmits the MobilityFrom "source RAT" Command message to the UE 102. After sending the MobilityFrom "source RAT" Command message to the S-DU 174B, the CU 172 can perform an S-DU Release procedure and/or a Context Release procedure with the S-DU 174B.

The UE 102 can perform handover to the cell of the target RAT according to the target handover command message and transmit a target handover complete message on the cell of the target RAT in response to the target handover command message.

In some implementations, the source RAT can be EUTRA and the MobilityFrom "source RAT" Command can be a MobilityFromEUTRACommand message. If the target RAT is NR, the target handover command message and the target handover complete message can be an RRCReconfiguration message and an RRCReconfigurationComplete message, respectively. If the target RAT is UTRAN, the target handover command message and the target handover complete message can be a HandoverToUTRANCommand message and a HandoverToUTRANComplete message, respectively. If the target RAT is GSM, the target handover command message and the target handover complete message can be a Handover Command message and a Handover Complete message, respectively. If one of the source RAT and the target RAT is EUTRA/EPC, the other is EUTRA/5GC, and the target handover command message and the target handover complete message can be an RRCConnectionReconfiguration message and an RRCConnectionReconfigurationComplete message, respectively.

In other implementations, the source RAT can be NR and the MobilityFrom "source RAT" Command can be a MobilityFromNRCommand message. If the target RAT is EUTRA, the target handover command message and the target handover complete message can be an RRCConnectionReconfiguration message and an RRCConnectionReconfigurationComplete message, respectively. If the target RAT is UTRAN, the target handover command message and the target handover complete message can be a HandoverToUTRANCommand message and a HandoverToUTRANComplete message, respectively.

If the base station 106A is a master eNB (MeNB) or master ng-eNB (Mng-eNB), the MCG failure recovery message can be an RRCConnectionReconfiguration message including a MobilityControlInfo IE for intra-system handover to a EUTRA cell. In some implementations, the CU 172 can prepare handover to a suitable EUTRA cell for the UE 102, by generating the RRCConnectionReconfiguration message, or obtaining the RRCConnectionReconfiguration message from a target base station (i.e., an eNB or ng-eNB). Then the CU 172 transmits the RRCConnectionReconfiguration message to the S-DU 174B, which in turn transmits the RRCConnectionReconfiguration message to the UE 102. The UE 102 can resume MCG transmissions on the EUTRA cell after receiving the RRCConnectionReconfiguration message. The UE 102 performs handover to the EUTRA cell according to the RRCConnectionReconfiguration message and transmits an RRCConnectionReconfigurationComplete message on the EUTRA cell in response to the RRCConnectionReconfiguration message.

In some implementations, the CU 172 or the target base station can indicate release of the S-DU 174B in the RRCConnectionReconfiguration message. After sending the RRCConnectionReconfiguration message to the S-DU 174B, the CU 172 can perform a S-DU Release procedure and/or a Context Release procedure with the S-DU 174B.

If the base station 106A is a master gNB (MgNB), the MCG failure recovery message can be an RRCReconfiguration message including a ReconfigurationWithSync IE for handover to a NR cell. In some implementations, the CU 172 can prepare handover to a suitable NR cell for the UE 102, by generating the RRCReconfiguration message, or obtaining the RRCReconfiguration message from a target gNB. Then the CU 172 transmits the RRCReconfiguration message to the S-DU 174B, which in turn transmits the RRCReconfiguration message to the UE 102. The UE 102 can resume MCG transmissions on the NR cell after receiving the RRCReconfiguration message. The UE 102 performs handover to the NR cell according to the RRCReconfiguration message and transmits an RRCReconfigurationComplete message on the NR cell in response to the RRCReconfiguration message.

In some implementations, the CU 172 or the target gNB can indicate release of the S-DU 174B in the RRCReconfiguration message. After sending the RRCReconfiguration message to the S-DU 174B, the M-DU 174A can perform an SN Release procedure and/or a Context Release procedure with the S-DU 174B.

If the base station 106A is a master eNB (MeNB) or master ng-eNB (Mng-eNB), the MCG failure recovery message can be an RRCConnectionRelease message redirecting the UE 102 to a EUTRA cell or a target RAT cell. Similarly, if the base station 106A is a MgNB, the MCG failure recovery message can be an RRCRelease message redirecting the UE 102 to an NR cell or a target RAT cell. In either the RRCConnectionRelease message or RRCRelease message, the CU 172 can command the UE 102 to enter an idle state or inactive state, and redirect the UE 102 to a particular cell (e.g., NR cell, EUTRA cell, UTRAN cell or GSM cell) and/or a particular carrier frequency (e.g., a EUTRA, NR, UTRAN, or GSM carrier frequency). The UE 102 transitions to the idle or inactive state and selects the particular cell or a particular cell on the particular carrier frequency according to the RRCConnectionRelease message or RRCRelease message.

Now referring to FIG. 6, whereas the UE 102 of FIG. 5, after detecting MCG failure with an M-DU of base station 106A, can perform a fast MCG recovery procedure with an S-DU of the same base station 106A, the UE 102 of FIG. 6, after detecting MCG failure with an MN 106A, can perform a fast MCG recovery procedure with another base station (e.g., SN 104). Otherwise, any of the implementations described above in reference to FIG. 5 can be applied to scenario 600 of FIG. 6.

Similar to scenario 500, in scenario 600 of FIG. 6, the UE 102 initially communicates 602 in DC with the MN 106A and the SN 104. The UE 102 in DC then performs 650 a sidelink configuration procedure with the MN 106A. Thus, the UE 102 provides first sidelink UE information to the MN 106A, which in turn provides first sidelink configuration(s) to the UE 102.

During or after performing 650 the sidelink configuration procedure, the UE 102 detects 678 failure on an MCG radio connection with the MN 106A. In response to detecting 678 the failure, the UE 102 retains 654 the first sidelink UE information, similar to event 554. In some implementations, the UE 102 retains the first sidelink configuration(s) in response to detecting 678 the failure. In other implementations, in response to detecting 678 the failure, the UE 102 releases 652 the first sidelink UE information, similar to event 552, and releases the first sidelink configuration(s).

After detecting 678 the MCG failure, the UE 102 can perform a fast MCG recovery procedure with the RAN 105. In one implementation of the fast MCG recovery procedure, the UE 102 suspends MCG transmissions (i.e., suspend transmissions on all of MCG link(s) with the MN 106A) and transmits 631 an MCG failure information message to the SN 104, which in turn sends 633 the MCG failure information message to the MN 106A. In some implementations, the MCG failure information message can indicate whether the UE 102 retained or released the first sidelink UE information at events 654 and 652, respectively. In turn, in response to receiving the MCG failure information message, the MN 106A can correspondingly retain 653 or release 651 the first sidelink UE information, similar to events 553 or 551, and subsequently send 635 an MCG failure recovery message (e.g., MobilityFrom "source RAT" Command message, RRCConnectionReconfiguration message, RRCReconfiguration message, RRCConnectionRelease message, RRCRelease message) to the SN 104, which in turn transmits 637 the MCG failure recovery message to the UE 102. The UE 102 can resume MCG transmissions in SC with the SN 104 (which now serves the UE 102 as an MN), or transition to the idle or inactive state according to the MCG failure recovery message.

In some implementations, after performing the fast MCG recovery procedure, the UE 102 can perform 660 a sidelink configuration procedure via the SN 104, similar to events 460A and 460B, if the UE 102 is still interested in providing sidelink UE information to the SN 104 to perform sidelink communication with the UE 103. Thus, the UE 102 can send second sidelink UE information to the SN 104. In turn, the SN 104 can send second sidelink configuration(s) and/or second non-sidelink configuration(s) to the UE 102. Then the UE 102 can use the second sidelink configuration(s) to perform sidelink communication with the UE 103 and/or use the second non-sidelink configuration(s) to communicate with the SN 104. Otherwise, if the UE 102 is no longer interested in providing sidelink UE information to perform sidelink communication with the UE 103 or the UE 102 is not capable of performing sidelink communication, the UE 102 does not perform 660 the sidelink configuration procedure.

Now referring to FIG. 7A, whereas the UE 102 of FIG. 3A releases the first sidelink UE information after detecting a failure, the UE 102 of FIG. 7A releases the first sidelink UE information after suspending a radio connection. Otherwise, any of the implementations described above in reference to FIG. 3A can be applied to scenario 700A of FIG. 7A.

Similar to scenario 300A, in scenario 700A, the UE 102 initially communicates 702A with the CU 172 via S-DU 174A, e.g., on cell 125A, similar to event 302A. The UE 102 then performs 750A a sidelink configuration procedure with the S-DU 174A and CU 172, similar to the sidelink configuration procedure 350A. Thus, the UE 102 provides first sidelink UE information to the base station 106A, which in turn provides first sidelink configuration(s) and/or an S-DU configuration to the UE 102.

Later in time (e.g., after the CU 172 detects that traffic of the UE 102 is inactive on the BS-terminated radio bearer(s)), the CU 172 determines to suspend a radio connection (e.g., including an RRC connection) with the UE 102. The CU 172 then sends 724A an RRC suspension message (e.g., an RRCRelease message, an RRCConnectionRelease message) to the S-DU 174A, which in turn transmits 726A the RRC suspension message to the UE 102. As a result, the UE 102 suspends 728A the radio connection, and can transition to an inactive state or an idle state. In some implementations, the CU 172 can send 724A a UE Context Release Command message including the RRC suspension message to the S-DU 174A, which in turn can send a UE Context Release Complete message to the CU 172 in response. The RRC suspension message can include a SuspendConfig IE, an RRC-InactiveConfig-r15 IE, or a ResumeIdentity-r13 IE. The events 724A, 726A, and 728A are collectively referred to in FIG. 7A as an RRC suspension procedure 778A.

Later in time after suspending 728A the radio connection, the UE 102 can perform an RRC resume procedure 780A to transition from the inactive or idle state to the connected state, e.g., in response to determining to initiate a data transmission with the base station 106A, or in response to a Paging message received from the base station 106A. In the RRC resume procedure 780A, the UE 102 transmits 730A an RRC resume request message to the T-DU 174B, which in turn sends 732A the RRC resume request message to the CU 172. In turn, the CU 172 sends 796A a UE Context Setup Request message to T-DU 174B, which in turn sends 798A a UE Context Setup Response message including a T-DU configuration. In response, the CU 172 sends 734A an RRC resume message including the T-DU configuration to the T-DU 174B, which in turn transmits 736A the RRC resume message to the UE 102. As a result, the UE 102 resumes 738A the suspended radio connection with the T-DU 174B in response to the RRC resume message and transitions to the connected state. The UE 102 can transmit 740A an RRC resume complete message to the T-DU 174B, which in turn can send 742A the RRC resume complete message to the CU 172. Although the UE 102 is described as performing the RRC resume procedure 780A with the T-DU 174B, in other implementations, the UE 102 can perform the RRC resume procedure 780A with another DU (i.e., different than T-DU 174B), such as S-DU 174A, connected to the CU 172.

In some implementations, after the base station 106A performs the RRC suspension procedure 778A with the UE 102, the UE 102 can release 752A the first sidelink UE information (e.g., in response to receiving 726A the RRC suspension message), similar to event 352A. Similarly, in some implementations, the CU 172 can release 751A the first sidelink UE information in response to determining to suspend the radio connection with the UE 102, similar to event 351A. In other implementations, the UE 102 can release 752A the first sidelink UE information in response to initiating the RRC resume procedure 780A (e.g., transmitting 730A the RRC resume request message), during the RRC resume procedure 780A (e.g., in response to receiving 736A the RRC resume message), or after transmitting 740A the RRC resume complete message. Similarly, in some implementations, the CU 172 can release 751A the first sidelink UE information during the RRC resume procedure 780A (e.g., in response to receiving 732A the RRC resume request message, transmitting 734A the RRC resume message), or after receiving 742A the RRC resume complete message.

In some implementations, after resuming 738A the suspended radio connection, the UE 102 can perform 760A a sidelink configuration procedure with the CU 172 via the T-DU 174B, similar to event 360A, if the UE 102 is still interested in providing sidelink UE information to the CU 172 to perform sidelink communication with the UE 103. Thus, the UE 102 can send second sidelink UE information to the CU 172 via the T-DU 174B. In turn, the CU 172, via the T-DU 174B, can send second sidelink configuration(s) and/or second non-sidelink configuration(s) to the UE 102 and/or use the second non-sidelink configuration(s) to communicate with the T-DU 174B. Then the UE 102 can use the second sidelink configuration(s) to perform sidelink communication with the UE 103. Otherwise, if the UE 102 is no longer interested in providing sidelink UE information to perform sidelink communication with the UE 103, the UE 102 does not perform 760A the sidelink configuration procedure.

Although the UE 102 is described as performing the RRC resume procedure (e.g., in events 730A, 732A, 796A, 798A, 734A, 736A, 738A, 740A) with the T-DU 174B and CU 172, in other implementations, the UE 102 can alternatively perform the RRC resume procedure with the S-DU 174A and CU 172. In such implementations, the UE 102 can perform 760A a sidelink configuration procedure with the CU 172 via the S-DU 174A.

Now referring to FIG. 7B, whereas the UE 102 and the CU 172 of FIG. 7A each release the first sidelink UE information, the UE 102 and the CU 172 of FIG. 7B each retain the first sidelink UE information, and later the UE 102 can provide second sidelink UE information to override the retained first sidelink UE information after resuming the suspended radio connection with the base station 106A. Otherwise, any of the implementations described above in reference to FIG. 7A can be applied to scenario 700B of FIG. 7B.

Similar to scenario 700A, in scenario 700B, the UE 102 initially communicates 702B with the CU 172 via S-DU 174A, e.g., on cell 125A, similar to event 702A. The UE 102 then performs 750B a sidelink configuration procedure with the S-DU 174A and CU 172, similar to the sidelink configuration procedure 750A. Thus, the UE 102 provides first sidelink UE information to the base station 106A, which in turn provides first sidelink configuration(s) and/or an S-DU configuration to the UE 102.

Later in time, the CU 172 determines to suspend a radio connection with the UE 102, and thus performs 778B an RRC suspension procedure with the UE 102, similar to event 778A. As a result, the UE 102 suspends the radio connection, and can transition to an inactive state or an idle state.

After the base station 106A performs the RRC suspension procedure 778B with the UE 102, the UE 102 can retain 754B the first sidelink UE information, similar to event 354B. Similarly, in some implementations, the CU 172 can retain 753B the first sidelink UE information in response to determining to suspend the radio connection with the UE 102, similar to event 351B.

Later in time after suspending the radio connection, the UE 102 can perform an RRC resume procedure 781B to transition from the inactive or idle state to the connected state, similar to event 780A. In the RRC resume procedure 781B, the UE 102 transmits 730B an RRC resume request message to the T-DU 174B, which in turn sends 732B the RRC resume request message to the CU 172. In turn, the CU 172 sends 796B a UE Context Setup Request message that includes the first sidelink UE information retained at event 753B to T-DU 174B, which in turn sends 798B a UE Context Setup Response message including a T-DU configuration and first sidelink configuration(s) according to the first sidelink UE information. In response, the CU 172 sends 735B an RRC resume message including the T-DU configuration and the first sidelink configuration(s) to the T-DU 174B, which in turn transmits 737B the RRC resume message to the UE 102. As a result, the UE 102 resumes 738B the suspended radio connection with the T-DU 174B in response to the RRC resume message and transitions to the connected state. The UE 102 can transmit 740B an RRC resume complete message to the T-DU 174B, which in turn can send 742B the RRC resume complete message to the CU 172, similar to events 740A and 742A, respectively.

In some implementations, after resuming 738B the suspended radio connection, the UE 102 can perform 760B a sidelink configuration procedure with the CU 172 via the T-DU 174B, similar to event 760A, if the UE 102 is still interested in providing sidelink UE information to the CU 172 to perform sidelink communication with the UE 103. Thus, the UE 102 can send second sidelink UE information to the CU 172 via the T-DU 174B to update the retained first sidelink UE information. In turn, the CU 172, via the T-DU 174B, can send second sidelink configuration(s) and/or second non-sidelink configuration(s) according to the second sidelink UE information to the UE 102. Then the UE 102 can use the second sidelink configuration(s) to perform sidelink communication with the UE 103 and/or use the second non-sidelink configuration(s) to communicate with the T-DU 174B. Otherwise, if the UE 102 is no longer interested in providing sidelink UE information to perform sidelink communication with the UE 103, the UE 102 does not perform 760B the sidelink configuration procedure.

Now referring to FIG. 8A, whereas the UE 102 of FIG. 7A, after suspending a radio connection with the S-DU of a base station, can resume a radio connection with a T-DU of the same base station, the UE 102 of FIG. 8A resumes a radio connection with another base station. Otherwise, any of the implementations described above in reference to FIG. 7A can be applied to scenario 800A of FIG. 8A.

Similar to scenario 700A, in scenario 800A, the UE 102 initially communicates 802A with the S-BS 104, e.g., on cell 124, similar to event 702A. The UE 102 then performs 850A a sidelink configuration procedure with the S-BS 104, similar to the sidelink configuration procedure 750A. Thus, the UE 102 provides first sidelink UE information to the S-BS 104, which in turn provides first sidelink configuration(s) and/or an S-DU configuration to the UE 102.

Later in time (e.g., after the S-BS 104 detects that traffic of the UE 102 is inactive on the BS-terminated radio bearer(s)), the S-BS 104 determines to suspend a radio connection (e.g., including an RRC connection) with the UE 102. The S-BS 104 then performs 878A an RRC suspension procedure with the UE 102, similar to the RRC suspension procedure 778A. As a result, the UE 102 suspends the radio connection, and can transition to an inactive state or an idle state.

Later in time after suspending the radio connection, the UE 102 can perform an RRC resume procedure 880A to transition from the inactive or idle state to the connected state, e.g., in response to determining to initiate a data transmission with another base station, such as the T-BS 106A, or in response to a Paging message received from the T-BS 106A. In the RRC resume procedure 880A, the UE 102 transmits 830A an RRC resume request message to the T-DU 174, which in turn sends 832A the RRC resume request message to the T-CU 172. After receiving the RRC resume request message, the T-CU 172 then transmits 892A a Retrieve UE Context Request message to the S-BS 104. In response, the S-BS 104 transmits 894A a Retrieve UE Context Response message including the first sidelink UE information retained by the S-BS 104 at event 850A to the T-CU 172. In some implementations, the S-BS 104 can include other configurations (e.g., an S-BS configuration for the UE 102 to communicate via uplink and/or downlink with the S-BS 104) for the UE 102 in the Retrieve UE Context Response message. In some implementations, after transmitting 894A the Retrieve UE Context Response message, the S-BS 104 can release 851A the first sidelink UE information.

In response to receiving 832A the RRC resume request message or the first sidelink UE information in event 894A, the T-CU 172 releases 855A the first sidelink UE information, similar to event 455A. In some implementations, after the S-BS 104 determines to suspend the radio connection with the UE 102 as discussed above, the S-BS 104 transmits 894A the Retrieve UE Context Response message excluding the first sidelink UE information to the T-CU 172, so that the T-CU 172 need not release the first sidelink UE information.

In response to releasing 855A the first sidelink UE information or receiving 894A the Retrieve UE Context Response message excluding the first sidelink UE information, the T-CU 172 then sends 896A a CU to DU interface message to the T-DU 174 to request a T-DU configuration from the T-DU 174. In response, the T-DU 174 sends 898A a DU to CU interface message including the T-DU configuration to the T-CU 172. In response, the T-CU 172 sends 834A an RRC resume message including the T-DU configuration to the T-DU 174, which in turn transmits 836A the RRC resume message to the UE 102. As a result, the UE 102 resumes 838A the suspended radio connection with the T-DU 174 in response to the RRC resume message and transitions to the connected state. The UE 102 can transmit 840A an RRC resume complete message to the T-DU 174, which in turn can send 842A the RRC resume complete message to the T-CU 172.

In some implementations, after the S-BS 104 performs the RRC suspension procedure 878A with the UE 102, the UE 102 can release 852A the first sidelink UE information, similar to event 752A. In other implementations, the UE 102 can release 852A the first sidelink UE information in response to initiating the RRC resume procedure 880A (e.g., transmitting 830A the RRC resume request message), during the RRC resume procedure 880A (e.g., in response to receiving 836A the RRC resume message), or after transmitting 840A the RRC resume complete message.

In some implementations, after resuming 838A the suspended radio connection, the UE 102 can perform 860A a sidelink configuration procedure with the T-CU 172 via the T-DU 174, similar to event 760A, if the UE 102 is still interested in providing sidelink UE information to the T-CU 172 to perform sidelink communication with the UE 103. Thus, the UE 102 can send second sidelink UE information to the T-CU 172 via the T-DU 174. In turn, the T-CU 172, via the T-DU 174, can send second sidelink configuration(s) according to the second sidelink UE information to the UE 102. Then the UE 102 can use the second sidelink configuration(s) to perform sidelink communication with the UE 103. Otherwise, if the UE 102 is no longer interested in providing sidelink UE information to perform sidelink communication with the UE 103, the UE 102 does not perform 860A the sidelink configuration procedure.

Now referring to FIG. 8B, whereas the UE 102 and the T-CU 172 of FIG. 8A each release the first sidelink UE information, the UE 102 and the T-CU 172 of FIG. 8B each retain the first sidelink UE information, and later the UE 102 can provide second sidelink UE information to override the retained first sidelink UE information after resuming the suspended radio connection with the base station 106A. Otherwise, any of the implementations described above in reference to FIG. 8A can be applied to scenario 800B of FIG. 8B.

Similar to scenario 800A, in scenario 800B, the UE 102 initially communicates 802B with the S-BS 104, e.g., on cell 124, similar to event 802A. The UE 102 then performs 850B a sidelink configuration procedure with the S-BS 104, similar to the sidelink configuration procedure 850A. Thus, the UE 102 provides first sidelink UE information to the S-BS 104, which in turn provides first sidelink configuration(s) and/or an S-DU configuration to the UE 102.

Later in time, the S-BS 104 determines to suspend a radio connection (e.g., including an RRC connection) with the UE 102. The S-BS 104 then performs 878B an RRC suspension procedure with the UE 102, similar to the RRC suspension procedure 878A. As a result, the UE 102 suspends the radio connection, and can transition to an inactive state or an idle state.

After the S-BS 104 performs the RRC suspension procedure 878B with the UE 102, the UE 102 can retain 854B the first sidelink UE information, similar to event 754B. Similarly, in some implementations, the S-BS 104 can retain 853B the first sidelink UE information in response to determining to suspend the radio connection with the UE 102, similar to event 753B.

Later in time after suspending the radio connection, the UE 102 can perform an RRC resume procedure 881B to transition from the inactive or idle state to the connected state, similar to event 781B. In the RRC resume procedure 881B, the UE 102 transmits 830B an RRC resume request message to the T-DU 174, which in turn sends 832B the RRC resume request message to the T-CU 172. After receiving the RRC resume request message, the T-CU 172 then transmits 892B a Retrieve UE Context Request message to the S-BS 104. In response, the S-BS 104 transmits 894B a Retrieve UE Context Response message including the first sidelink UE information retained by the S-BS 104 at event 853B to the T-CU 172. In some implementations, the S-BS 104 can include other configurations (e.g., an S-BS configuration for the UE 102 to communicate via uplink and/or downlink with the S-BS 104) for the UE 102 in the Retrieve UE Context Response message. In turn, the T-CU 172 retains 856B the first sidelink UE information and subsequently sends 896B a UE Context Setup Request message that includes the retained first sidelink UE information to T-DU 174, which in turn sends 898B a UE Context Setup Response message including a T-DU configuration and first sidelink configuration(s) according to the first sidelink UE information. In response, the T-CU 172 sends 835B an RRC resume message including the T-DU configuration and the first sidelink configuration(s) to the T-DU 174, which in turn transmits 837B the RRC resume message to the UE 102. As a result, the UE 102 resumes 838B the suspended radio connection with the T-DU 174 in response to the RRC resume message and transitions to the connected state. The UE 102 can transmit 840B an RRC resume complete message to the T-DU 174, which in turn can send 842B the RRC resume complete message to the T-CU 172.

In some implementations, after resuming 838B the suspended radio connection, the UE 102 can perform 860B a sidelink configuration procedure with the T-CU 172 via the T-DU 174, similar to event 860A, if the UE 102 is still interested in providing sidelink UE information to the T-CU 172 to performing sidelink communication with the UE 103. Thus, the UE 102 can send second sidelink UE information to the T-CU 172 via the T-DU 174 to update the retained first sidelink UE information. In turn, the T-CU 172, via the T-DU 174, can send second sidelink configuration(s) according to the second sidelink UE information to the UE 102. Then the UE 102 can use the second sidelink configuration (s) to perform sidelink communication with the UE 103. Otherwise, if the UE 102 is no longer interested in providing sidelink UE information to perform sidelink communication with the UE 103, the UE 102 does not perform 860B the sidelink configuration procedure.

Several example methods that the UE 102 and the RAN 105 of this disclosure can implement are considered next. Each of these methods can be implemented using suitable processing hardware such as for example one or more processors configured to execute instructions stored on a non-transitory computer-readable medium.

Figure 9:
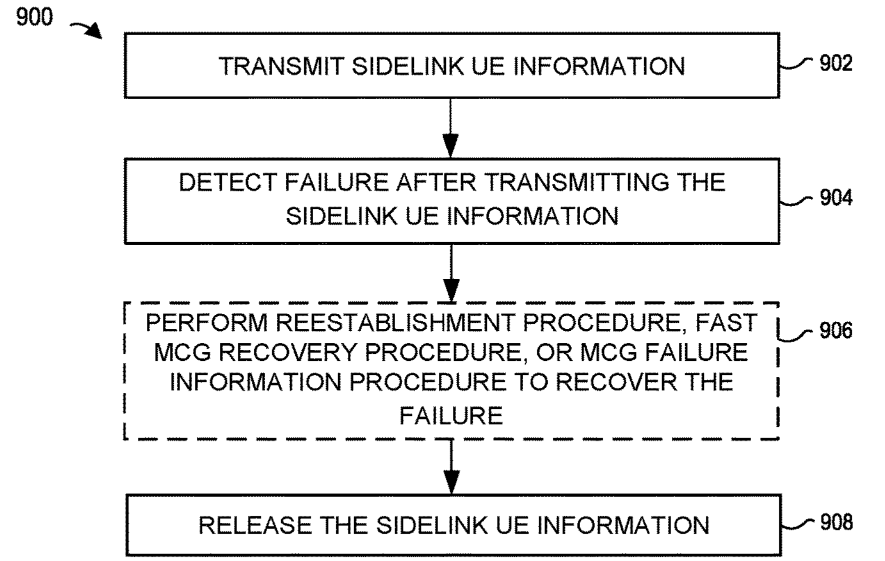
FIG. 9 is a flow diagram of an example method that includes releasing sidelink UE information after detecting failure on a radio connection, which can be implemented in the UE of FIG. 1A.

Referring now to FIG. 9, an example method 900 can be implemented in a UE (e.g., UE 102) for releasing sidelink UE information after detecting failure with a base station (e.g., S-BS 104, MN 106A, an M-DU 174A of a distributed base station 106A, or an S-DU 174A of a distributed base station 106A).

At block 902, a UE transmits sidelink UE information to a base station (e.g., in events 304A, 450A, 550, 650).

At block 904, the UE detects failure after transmitting the sidelink UE information to the base station (e.g., in events 378A, 478A, 578, 678).

In some implementations, the UE at block 906 performs an RRC reestablishment procedure, a fast MCG recovery procedure, or other suitable MCG recovery procedure (e.g., MCG failure information procedure) to recover from the failure (e.g., in events 330A, 336A, 340A, 430A, 436A, 440A, 531, 537, 631, 637). In some implementations, the UE performs the RRC reestablishment procedure or fast MCG recovery procedure with another DU (e.g., T-DU 174B, S-DU 174) of the same base station (base station 106A). In other implementations, the UE performs the RRC reestablishment procedure or fast MCG recovery procedure with another base station (e.g., T-DU 174 of T-BS 106A, SN 104).

At block 908, the UE releases the sidelink UE information (e.g., in events 352A, 452A, 552, 652). In some implementations, the UE releases the sidelink UE information in response to the failure detected at block 904A, prior to performing the RRC reestablishment procedure or fast MCG recovery procedure at block 906. In other implementations, the UE releases the sidelink UE information in response to (or while) performing the RRC establishment procedure or fast MCG recovery procedure at block 906. Accordingly, the UE can be configured to release the sidelink UE information in response to detecting the failure or in response to (or while) performing the RRC establishment procedure or fast MCG recovery procedure.

Figure 10A:
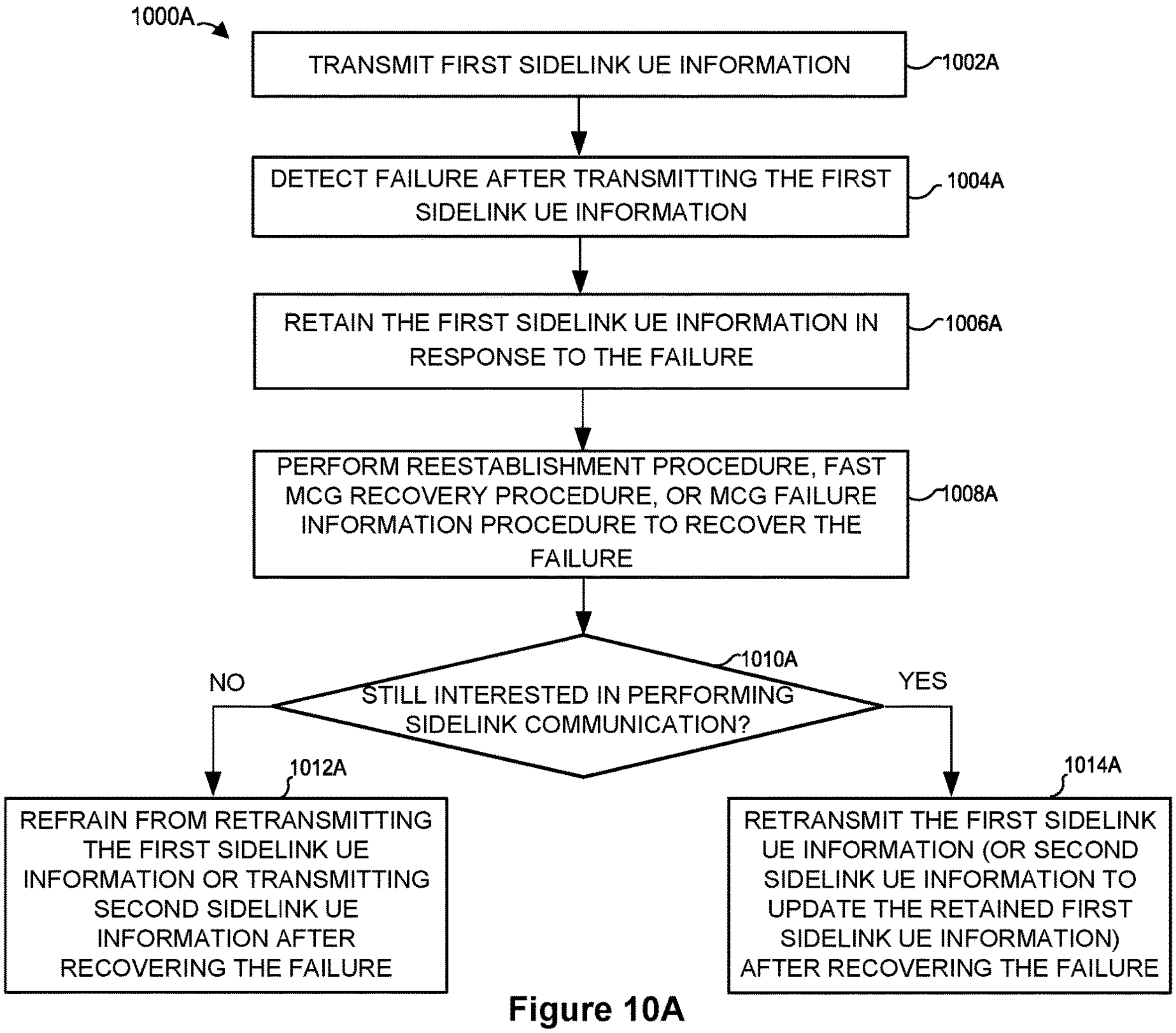
FIG. 10A is a flow diagram of an example method that includes retaining sidelink UE information after detecting failure on a radio connection, and subsequently transmitting the retained sidelink UE information or a new sidelink UE information if the UE is still interested in performing sidelink communication, which can be implemented in the UE of FIG. 1A.

Referring now to FIG. 10A, an example method 1000A can be implemented in a UE (e.g., UE 102) for transmitting sidelink UE information or a new sidelink UE information after detecting failure with a base station (e.g., S-BS 104, MN 106A, an M-DU 174A of a distributed base station 106A, or an S-DU 174A of a distributed base station 106A) if the UE is still interested in performing sidelink communication.

At block 1002A, a UE transmits first sidelink UE information to a first base station (e.g., in events 350B, 450B, 550, 650).

At block 1004A, the UE detects failure after transmitting the first sidelink UE information to the first base station (e.g., in events 378B, 478B, 578, 678).

At block 1006A, the UE retains the first sidelink UE information in response to detecting the failure (e.g., in events 354B, 454B, 554, 654).

At block 1008A, the UE performs an RRC reestablishment procedure, fast MCG recovery procedure, or other suitable MCG recovery procedure (e.g., MCG failure information procedure) to recover from the failure (e.g., in events 330B, 336B, 340B, 430B, 436B, 440B, 531, 537, 631, 637). In some implementations, the UE performs the RRC reestablishment procedure or fast MCG recovery procedure with another DU (e.g., T-DU 174B, S-DU 174) of the same first base station (e.g., base station 106A). In other implementations, the UE performs the RRC reestablishment procedure or fast MCG recovery procedure with a second, different base station (e.g., T-DU 174 of T-BS 106A, S-DU 174).

At block 1010A, after recovering from the failure with the first base station or the second base station, the UE determines whether it is still interested in performing sidelink communication with another UE (e.g., UE 103). In some implementations, the UE determines it is still interested in performing sidelink communication in response to a triggering event, such as when the UE determines that the detected failure at block 1004A occurs within a certain time threshold (e.g., one second) after transmitting the first sidelink UE information at block 1002A. Conversely, the UE determines it is not interested in performing sidelink communication when the UE determines that the detected failure at block 1004A occurs outside a certain time threshold after transmitting the first sidelink UE information at block 1002A. In other implementations, the UE determines it is still interested in performing sidelink communication when the UE performs the reestablishment procedure or fast MCG recovery procedure at block 1008A on a different cell than the one on which the UE transmitted the first sidelink UE information at block 1002A. Conversely, the UE determines it is not interested in performing sidelink communication when the UE performs the reestablishment procedure or fast MCG recovery procedure at block 1008A on the same cell than the one on which the UE transmitted the first sidelink UE information at block 1002A.

If the UE is still interested in performing sidelink communication with another UE (e.g., UE 103), the UE at block 1014A can either retransmit the same first sidelink UE information that was retained at block 1006A to the second base station (e.g., if the UE at block 1004A detected failure within one second of transmitting the first sidelink UE information or otherwise did not receive feedback from the first base station indicating that the transmission of the first sidelink UE information was successful), or alternatively, transmit a different second sidelink UE information to the first base station so that the second sidelink UE information can update the first sidelink UE information if retained by the first base station at block 1002A (e.g., in events 360B, 460B, 560, 660). Otherwise, if the UE is not still interested in performing sidelink communication with another UE, the UE at block 1012A refrains from transmitting either the first sidelink UE information or the second sidelink UE information.

Figure 10B:
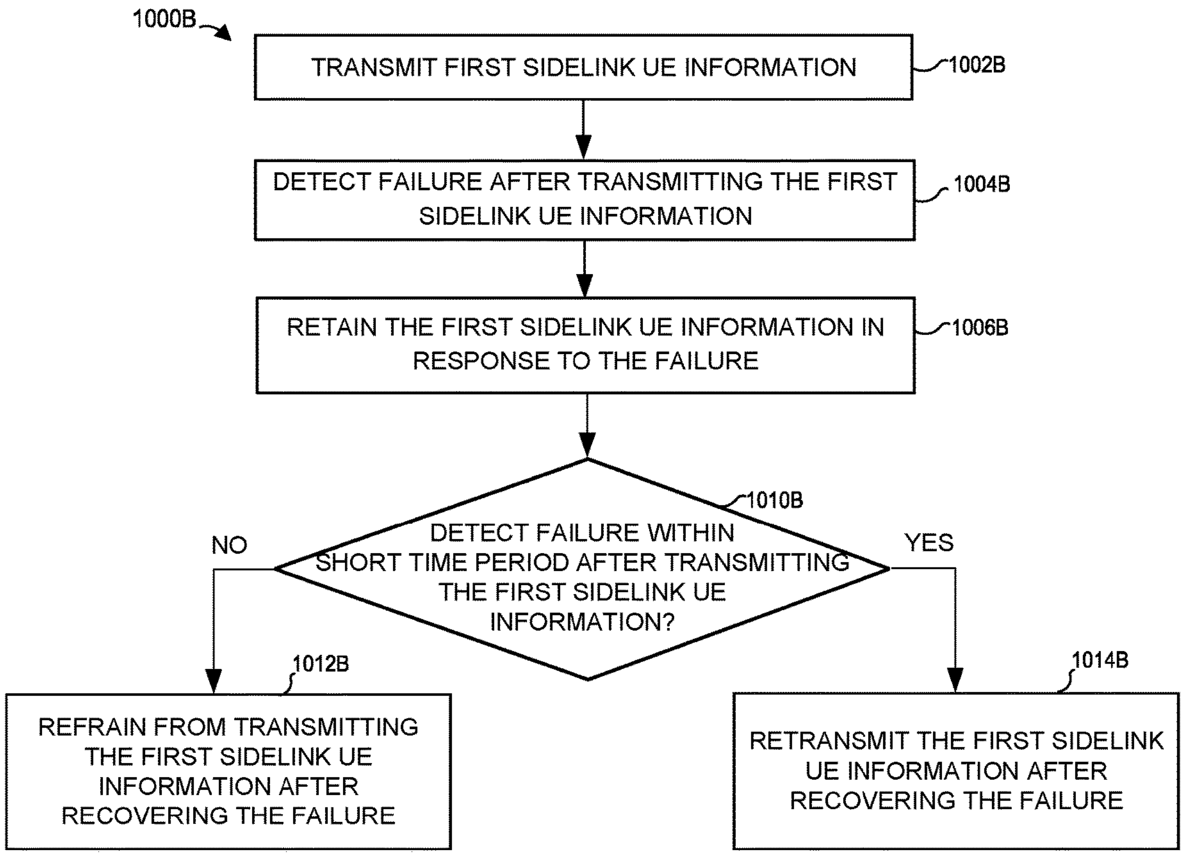
FIG. 10B is a flow diagram of an example method that includes detecting failure on a radio connection after initially transmitting sidelink UE information, and subsequently retransmitting the sidelink UE information if the detected failure occurred within a certain time threshold after initially transmitting the sidelink UE information, which can be implemented in the UE of FIG. 1A.

Referring now to FIG. 10B, similar to example method 1000A, an example method 1000B can be implemented in a UE (e.g., UE 102) for retransmitting the sidelink UE information after detecting failure with a RAN (e.g., RAN 105) in response to a triggering event.

At block 1002B, a UE transmits first sidelink UE information to a RAN (e.g., in events 350B, 450B, 550, 650).

At block 1004B, the UE detects failure after transmitting the first sidelink UE information to the RAN (e.g., in events 378B, 478B, 578, 678).

At block 1006B, the UE retains the first sidelink UE information in response to detecting the failure (e.g., in events 354B, 454B, 554, 654).

At block 1010B, the UE determines whether a certain triggering event occurs. In some implementations, if the UE detects the failure at block 1004B within a certain time threshold (e.g., within a short predetermined time period such as approximately one second) after transmitting the first sidelink UE information at block 1002B, the UE at block 1014B re-transmits the first sidelink UE information after recovering the failure. For example, due to the failure, the UE may be unaware of whether the RAN successfully received the first sidelink UE information, and therefore re-transmits the first sidelink UE information. If the UE did not detect the failure within a short time period after transmitting the first sidelink UE information, then the UE at block 1012B refrains from re-transmitting the first sidelink UE information after recovering the failure.

Figure 10C:
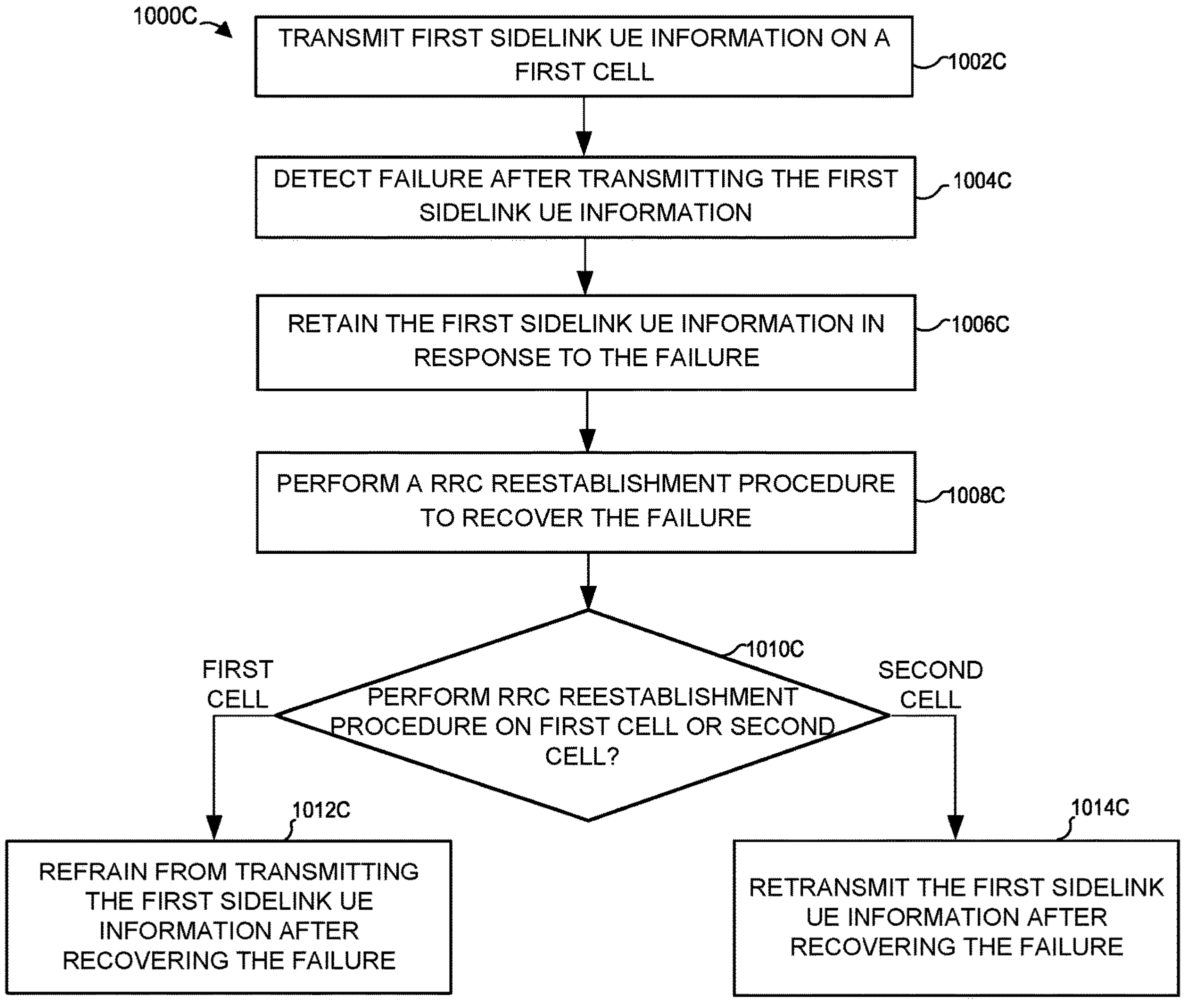
FIG. 10C is a flow diagram of an example method that includes detecting failure on a radio connection after initially transmitting sidelink UE information on a certain ell, and subsequently retransmitting the sidelink UE information if a reestablishment procedure is performed on a different cell, which can be implemented in the UE of FIG. 1A.

Referring now to FIG. 10C, similar to example method 1000A, an example method 1000C can be implemented in a UE (e.g., UE 102) for retransmitting the sidelink UE information after detecting failure with a RAN (e.g., RAN 105) in response to a triggering event.

At block 1002C, a UE transmits first sidelink UE information to a RAN on a first cell (e.g., in events 350B, 450B, 550, 650).

At block 1004C, the UE detects failure after transmitting the first sidelink UE information to the RAN (e.g., in events 378B, 478B, 578, 678).

At block 1006C, the UE retains the first sidelink UE information in response to detecting the failure (e.g., in events 354B, 454B, 554, 654).

At block 1008C, the UE performs an RRC reestablishment procedure to recover the failure.

At block 1010C, the UE determines whether a certain triggering event occurs. In some implementations, if the UE determines at block 1010C that the UE performed the RRC reestablishment procedure on the first cell, then the UE at block 1012C refrains from re-transmitting the first sidelink UE information after recovering the failure (e.g., because a RAN node supporting the first cell also retains the first sidelink UE information). If the UE determines at block 1010C that the UE performed the RRC reestablishment procedure on a second cell that is different from the first cell, then the UE at block 1014C re-transmits the first sidelink UE information after recovering the failure. For example, if the UE performs the RRC reestablishment procedure on the second cell, then the UE may be unaware of whether a RAN node supporting the second cell previously obtained the first sidelink UE information, and therefore re-transmits the first sidelink UE information after recovering the failure.

Figure 11:
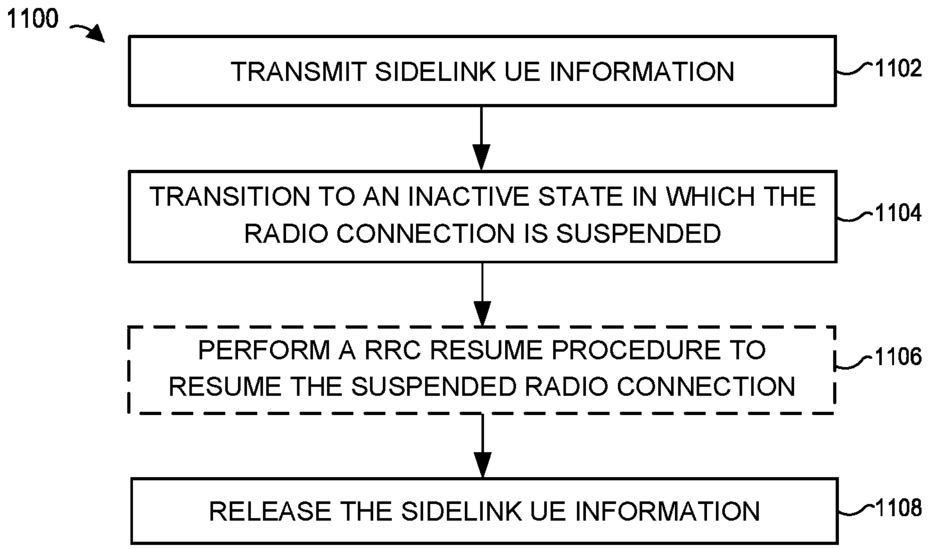
FIG. 11 is a flow diagram of an example method that includes releasing sidelink UE information after suspending a radio connection, which can be implemented in the UE of FIG. 1A.

Referring now to FIG. 11, an example method 1100 can be implemented in a UE (e.g., UE 102) for releasing sidelink UE information after suspending a radio connection with a base station (e.g., S-BS 104 or an S-DU 174A of a distributed base station 106A).

At block 1102, a UE in connected state transmits sidelink UE information to a base station over a radio connection (e.g., in events 750A, 850A).

At block 1104, the UE transitions to an inactive state in which the radio connection is suspended (e.g., in events 778A, 878A). In some implementations, the UE suspends the radio connection when the UE receives an RRC suspension message from the base station.

In some implementations, the UE at block 1106 performs an RRC resume procedure to resume the suspended radio connection (e.g., in events 730A, 736A, 740A, 830A, 836A, 840A). In some implementations, the UE performs the RRC resume procedure with another DU (e.g., T-DU 174B) of the same base station (base station 106A). In other implementations, the UE performs the RRC resume procedure with another base station (e.g., T-DU 174 of T-BS 106A).

At block 1108, the UE releases the sidelink UE information (e.g., in events 752A, 852A). In some implementations, the UE releases the sidelink UE information in response to receiving the RRC suspension message at block 1104A, prior to performing the RRC reestablishment procedure at block 1106. In other implementations, the UE releases the sidelink UE information in response to (or while) performing the RRC resume procedure at block 1106. Accordingly, the UE can be configured to release the sidelink UE information in response to receiving the RRC suspension message or in response to (or while) performing the RRC resume procedure.

Figure 12:
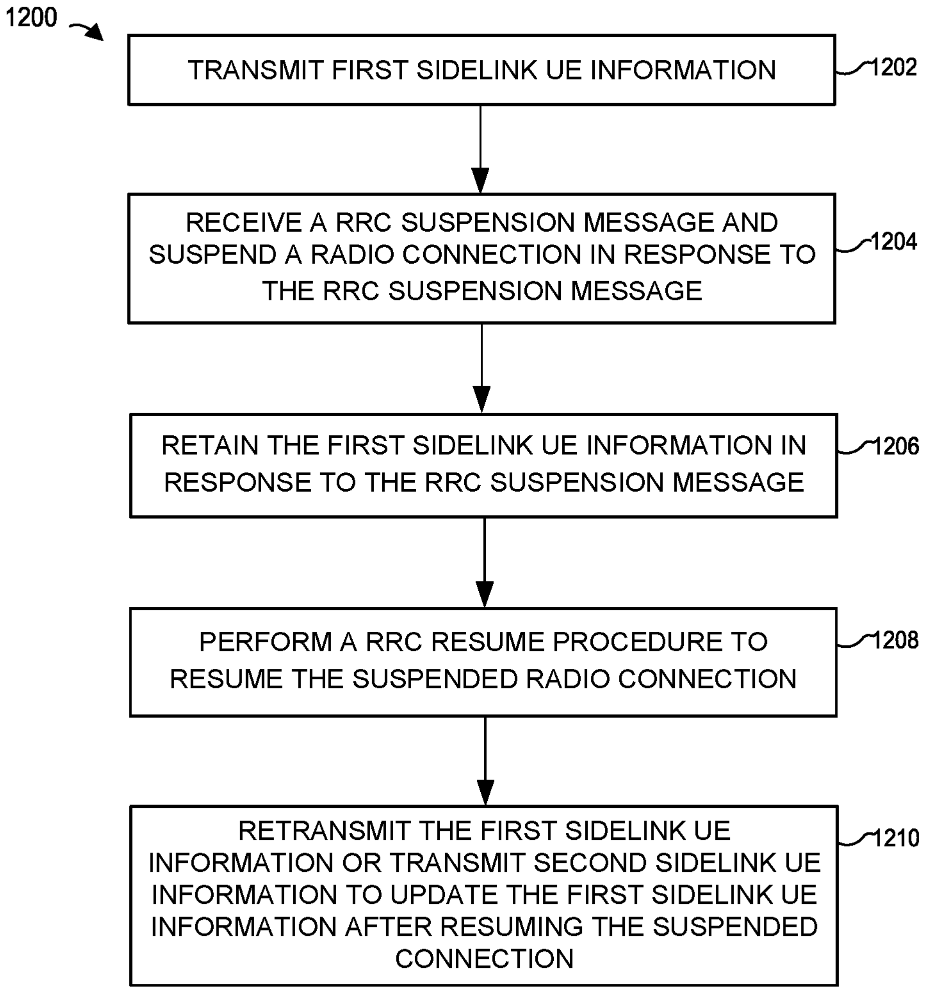
FIG. 12 is a flow diagram of an example method that includes retaining sidelink UE information after suspending a radio connection, and subsequently transmitting the retained sidelink UE information or a new sidelink UE information if the UE is still interested in performing sidelink communication, which can be implemented in the UE of FIG. 1A.

Referring now to FIG. 12, an example method 1200 can be implemented in a UE (e.g., UE 102) for retaining sidelink UE information after suspending a radio connection with a base station (e.g., S-BS 104 or an S-DU 174A of a distributed base station 106A).

At block 1202, a UE transmits first sidelink UE information to a first base station (e.g., in events 750B, 850B).

At block 1204, the UE receives an RRC suspension message from the first base station and suspends a radio connection with the first base station in response to the RRC suspension message (e.g., in events 778B, 878B).

At block 1206, the UE retains the first sidelink UE information in response to the RRC suspension message (e.g., in events 754B, 854B).

At block 1208, the UE performs an RRC resume procedure to resume the suspended radio connection (e.g., in events 730B, 737B, 740B, 830B, 837B, 840B). In some implementations, the UE performs the RRC resume procedure with another DU (e.g., T-DU 174B) of the same first base station (base station 106A). In other implementations, the UE performs the RRC resume procedure with a second, different base station (e.g., T-DU 174 of T-BS 106A).

At block 1210, after resuming the suspended connection with the first base station or the second base station, the UE can either retransmit the same first sidelink UE information that was retained at block 1206 to the second base station (e.g., if the UE at block 1204 suspended the radio connection within one second of transmitting the first sidelink UE information or otherwise did not receive feedback from the first base station indicating that the transmission of the first sidelink UE information was successful), or alternatively, transmit a different second sidelink UE information to the first base station so that the second sidelink UE information can update the first sidelink UE information if retained by the first base station at block 1202 (e.g., in events 760B, 860B).

Figure 13:
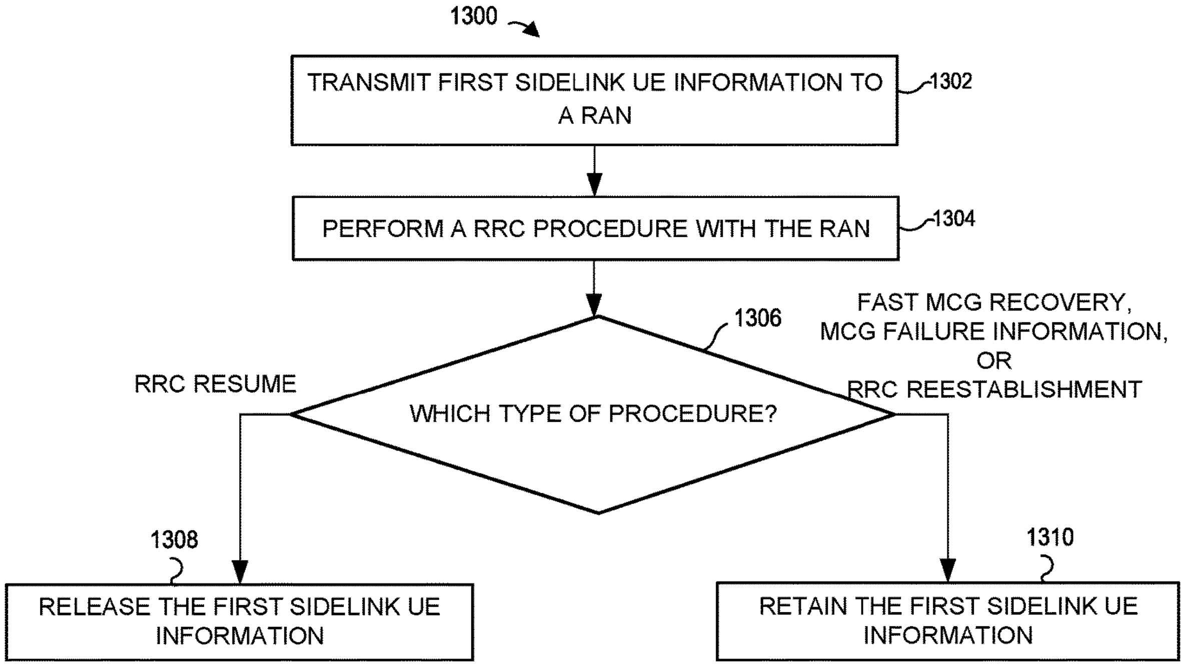
FIG. 13 is a flow diagram of an example method that includes retaining or releasing sidelink UE information based on a type of RRC procedure performed with a RAN, which can be implemented in the UE of FIG. 1A.

Referring now to FIG. 13, an example method 1300 can be implemented in a UE (e.g., UE 102) for releasing or retaining sidelink UE information after performing an RRC procedure with a base station (e.g., S-BS 104, MN 106A, an M-DU 174A of a distributed base station 106A, or an S-DU 174A of a distributed base station 106A).

At block 1302, a UE transmits first sidelink UE information to a first base station (e.g., in events 350B, 450B, 550, 650, 750A, 850A).

Later, at block 1304, the UE performs an RRC procedure (e.g., RRC reestablishment procedure, RRC resume procedure, fast MCG recovery procedure, MCG failure information procedure) with the first base station (e.g., in events 330B, 336B, 340B, 430B, 436B, 440B, 531, 537, 631, 637, 730A, 736A, 740A, 830A, 836A, 840A). In some implementations, the UE performs an RRC reestablishment procedure, fast MCG recovery procedure, or MCG failure information procedure with another DU (e.g., T-DU 174B, S-DU 174) of the same first base station (base station 106A), or with a second, different base station (e.g., T-DU 174 of T-BS 106A, S-DU 174) when the UE detects failure after transmitting the first sidelink UE information and attempts to recover from the failure. In some implementations, the UE performs an RRC resume procedure with another DU (e.g., T-DU 174B) of the same first base station (base station 106A) or with a second, different base station (e.g., T-DU 174 of T-BS 106A) when the UE suspends the radio connection after transmitting the first sidelink UE information and attempts to resume the suspended radio connection.

At block 1306, depending on the type of RRC procedure performed by the UE, the UE can either release or retain the first sidelink UE information. As illustrated in FIG. 13, in some implementations, if the UE performed an RRC resume procedure at block 1304, the UE can release the first sidelink UE information at block 1308 (e.g., in events 752A, 852A). If the UE performed an RRC reestablishment procedure, fast MCG recovery procedure, or MCG failure information procedure at block 1304, the UE can retain the first sidelink UE information at block 1310 (e.g., in events 354B, 454B, 554, 654). Other implementations are possible. For example, although not illustrated in FIG. 13, if the UE performed an RRC reestablishment procedure at block 1304, the UE can release the first sidelink UE information at block 1308 (e.g., in events 352A, 452A), instead of retaining the first sidelink UE information as shown in block 1310. If the UE performed a fast MCG recovery procedure or MCG failure information procedure at block 1304, the UE can release the first sidelink UE information at block 1308 (e.g., in events 552, 652), instead of retaining the first sidelink UE information as shown in block 1310.

Figure 14:
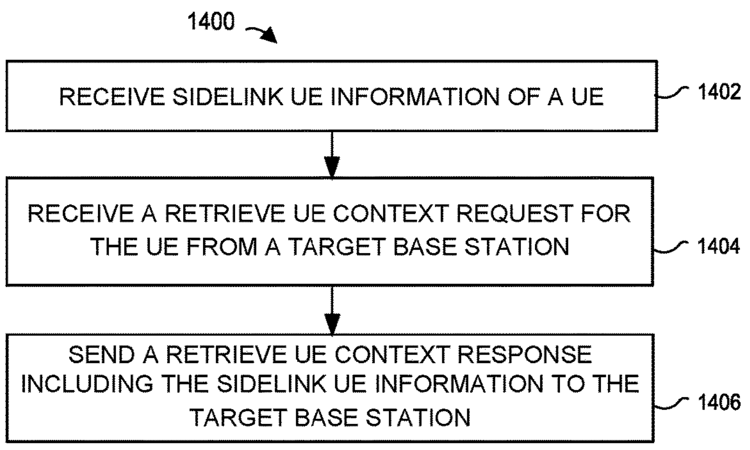
FIG. 14 is a flow diagram of an example method that includes forwarding sidelink UE information of a UE within a RAN, which can be implemented in a source base station of FIG. 1A or 1B.

Referring now to FIG. 14, an example method 1400 can be implemented in a source base station (e.g., S-BS 104) for receiving sidelink UE information of a UE (e.g., UE 102) and providing the received sidelink UE information to a target base station (e.g., T-BS 106A).

At block 1402, a source base station receives sidelink UE information of a UE (e.g., in events 450A, 450B, 850A, 850B). In some implementations, the source base station receives the sidelink UE information directly from the UE. In other implementations, the source base station receives the sidelink UE information from another base station when the source base station is involved in a handover procedure for the UE.

At block 1404, the source base station receives a Retrieve UE Context Request message from a target base station (e.g., in events 492A, 492B, 892A, 892B). In some implementations, the source base station receives the Retrieve UE Context Request message from the target base station when the UE attempts to reestablishment a connection with the target base station after detecting failure on a radio connection with the source base station. In other implementations, the source base station receives the Retrieve UE Context Request message from the target base station when the UE attempts to resume a suspended radio connection with the target base station after suspending a radio connection with the source base station.

At block 1406, the source base station sends a Retrieve UE Context Response message including the sidelink UE information retained by the source base station to the target base station (e.g., in events 494A, 494B, 894A, 894B). As described in FIGS. 4A-4B and 8A-8B, upon receiving the sidelink UE information, the target base station can either retain or release the sidelink UE information.

Figure 15:
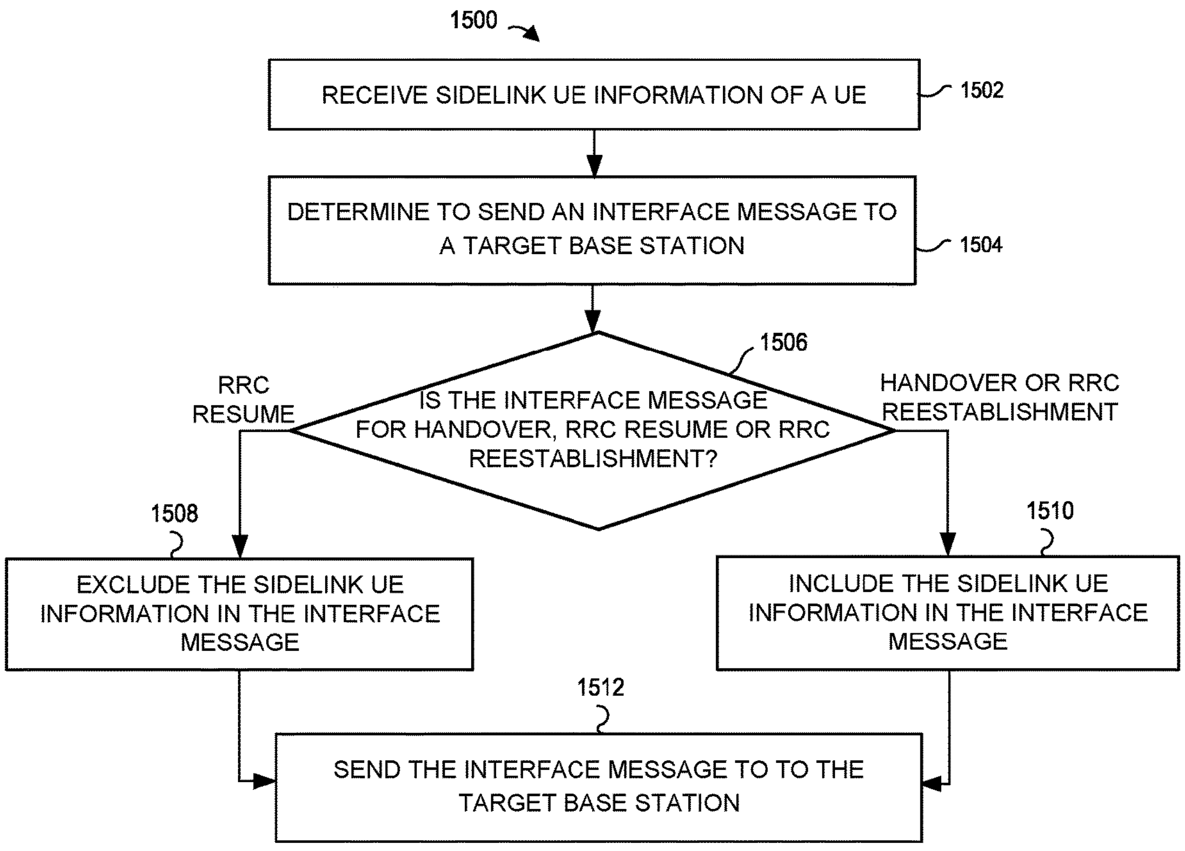
FIG. 15 is a flow diagram of an example method that includes determining whether to forward sidelink UE information of a UE within a RAN based on a type of RRC procedure performed with a UE, which can be implemented in a source base station of FIG. 1A or 1B.

Referring now to FIG. 15, an example method 1500 can be implemented in a source base station (e.g., S-BS 104) for excluding or including sidelink UE information of a UE (e.g., UE 102) in an interface message prior to sending the interface message to a target base station (e.g., T-CU 172 of T-BS 106A).

At block 1502, a source base station receives sidelink UE information of a UE (e.g., in events 450A, 450B, 850A, 850B), similar to block 1402.

At block 1504, the source base station determines to send an interface message to a target base station. In some implementations, the interface message can be a Retrieve UE Context Response message when the source base station is involved in an RRC reestablishment procedure with the target base station, as described in FIGS. 4A and 4B, or when the source base station is involved in an RRC resume procedure with the target base station, as described in FIGS. 8A and 8B. In other implementations, the interface message can be a handover request message when the source base station is involved in a handover procedure with the target base station. In some implementations, the source base station can forward its configuration(s) used to communicate with the UE in the interface message, so that the target base station is aware of the configuration(s) to communicate via uplink and/or downlink with the UE.

Depending on which procedure the interface message is for, the source base station can exclude or include the sidelink UE information received at block 1502 in the interface message. That is, at block 1506, if the source base station determines that the interface message is for an RRC resume procedure, the source base station at block 1508 can exclude the sidelink UE information in the interface message, and subsequently at block 1512 send the interface message to the target base station. Accordingly, the source base station does not forward the sidelink UE information to the target base station.

If the source base station at block 1506 determines that the interface message is for a handover procedure or an RRC reestablishment procedure, the source base station at block 1510 can include the sidelink UE information in the interface message, and subsequently at block 1512 send the interface message to the target base station (e.g., in events 494A, 494B). Accordingly, the source base station forwards the sidelink UE information to the target base station. In turn, the target base station can either retain or release the sidelink UE information.

Figure 16:
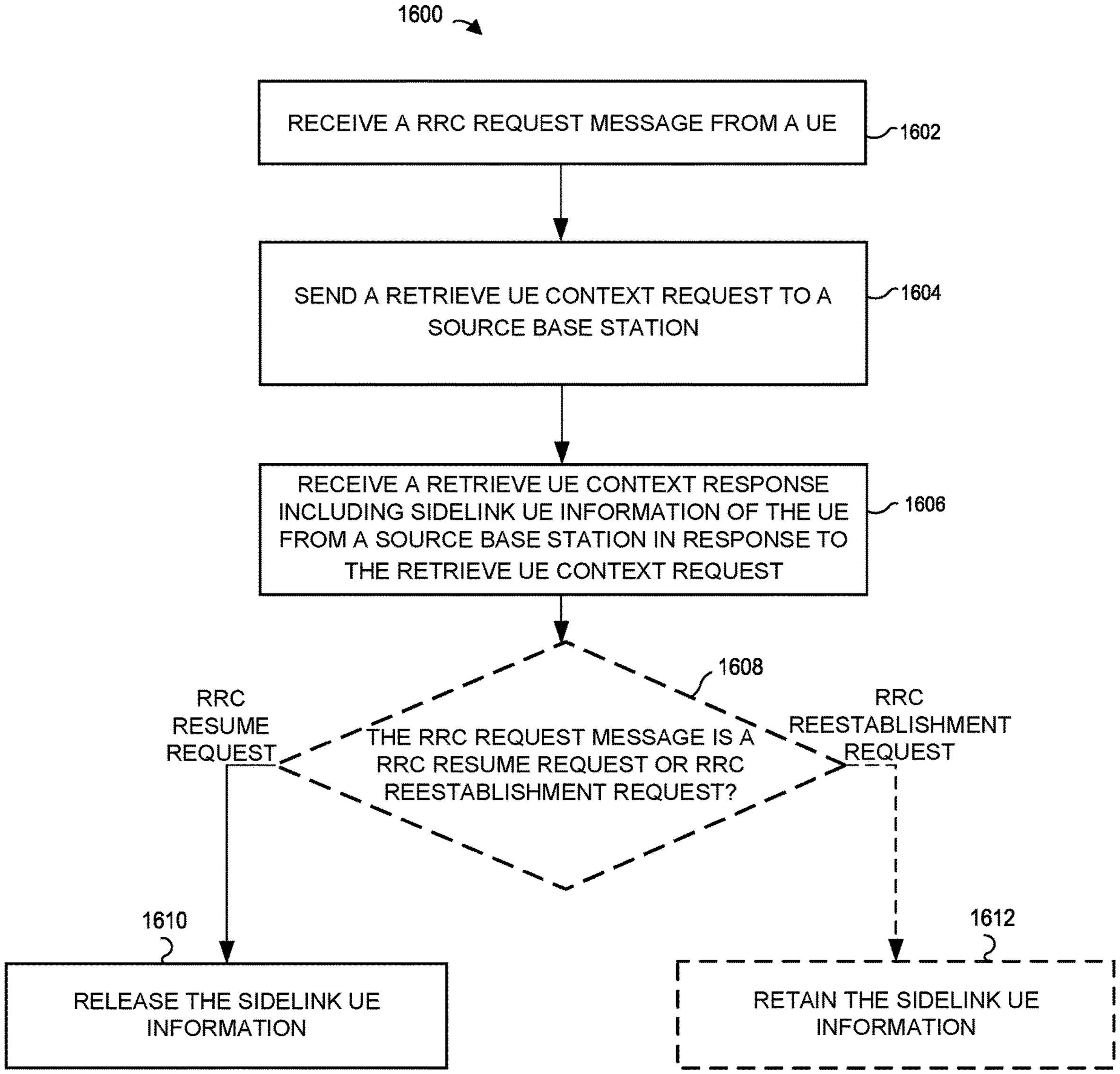
FIG. 16 is a flow diagram of an example method that includes receiving sidelink UE information of a UE within a RAN and subsequently releasing or retaining the sidelink UE information, which can be implemented in a target base station of FIG. 1A or 1B.

Referring now to FIG. 16, an example method 1600 can be implemented in a target base station (e.g., T-BS 106A) for releasing or retaining sidelink UE information received from a source base station (e.g., S-BS 104) after receiving an RRC request message from a UE (e.g., UE 102).

At block 1602, a target base station receives an RRC request message (e.g., RRC reestablishment request message, RRC resume request message) from a UE (e.g., in events 430B, 430A, 830B, 830B). In some implementations, the target base station receives an RRC reestablishment request message from the UE when the UE attempts to reestablish a connection with the target base station after detecting failure on a radio connection with a source base station. In other implementations, the target base station receives an RRC resume request message from the UE when the UE attempts to resume a suspended radio connection with the target base station after suspending a radio connection with the source base station.

At block 1604, the target base station sends a Retrieve UE Context Request message to the source base station (e.g., in events 492B, 492A, 892A, 892B).

At block 1606, the target base station receives a Retrieve UE Context Response message including the sidelink UE information retained by the source base station from the source target base station (e.g., in events 494B, 494A, 894A, 894B).

In some implementations, at block 1610, the target base station releases the sidelink UE information in response to receiving Retrieve UE Context Response message (e.g., in events 455A, 855A). In other implementations, the target base station releases or retains the sidelink UE information based on whether the RRC request message received at block 1602 is an RRC resume request message or an RRC reestablishment request message. If the target base station at block 1608 determines that the RRC request message is an RRC resume request message, the target base station at block 1610 releases the sidelink UE information (e.g., in event 855A). Otherwise, if the target base station at block 1608 determines that the RRC request message is an RRC reestablishment request message, the target base station at block 1612 retains the sidelink UE information (e.g., in event 453B).

Figure 17:
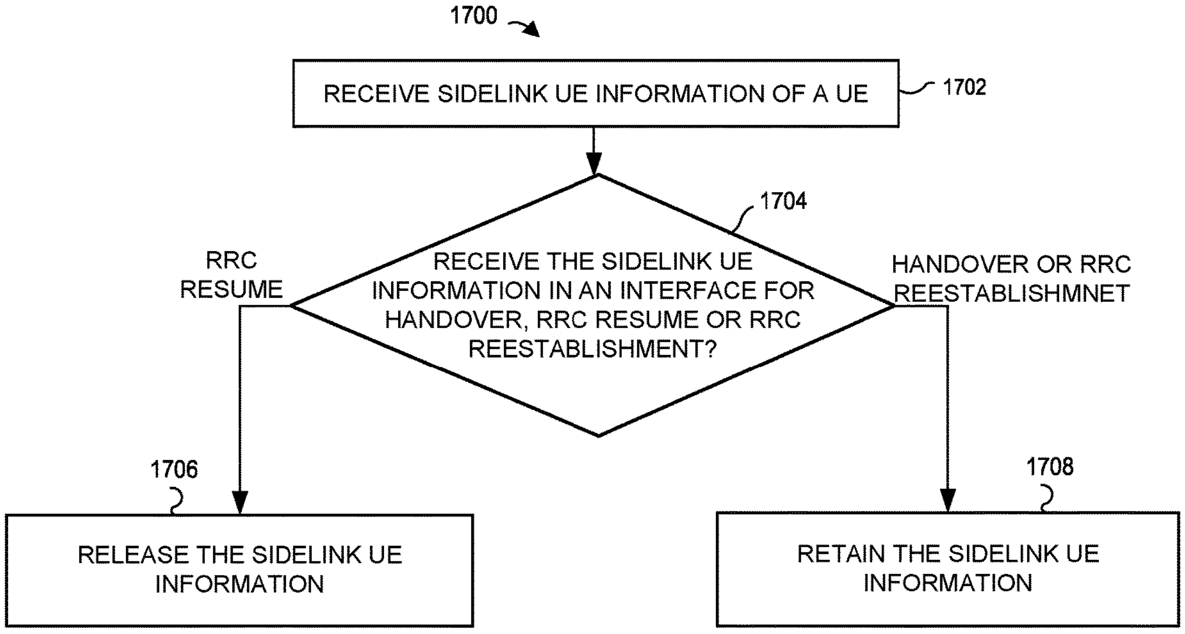
FIG. 17 is a flow diagram of an example method that includes receiving sidelink UE information of a UE within a RAN and subsequently releasing or retaining the sidelink UE information based on a type of RRC procedure performed with the UE, which can be implemented in a target base station of FIG. 1A or 1B.

Referring now to FIG. 17, an example method 1700 can be implemented in a target base station (e.g., T-BS 106A) for releasing or retaining sidelink UE information of a UE (e.g., UE 102) after receiving the sidelink UE information in an interface message from a source base station (e.g., S-BS 104).

At block 1702, a target base station receives sidelink UE information of a UE (e.g., in events 494A, 494B, 894A, 894B) in an interface message from a source base station. In some implementations, the interface message can be a Retrieve UE Context Response message when the target base station is involved in an RRC reestablishment procedure with the source base station, as described in FIGS. 4A and 4B, or when the target base station is involved in an RRC resume procedure with the source base station, as described in FIGS. 8A and 8B. In other implementations, the interface message can be a handover request message when the target base station is involved in a handover procedure with the source base station.

At block 1704, depending on which procedure the interface message is for, the target base station can either release or retain the sidelink UE information. As illustrated in FIG. 17, in some implementations, if the target base station at block 1704 determines that the interface message is for an RRC resume procedure, the target base station at block 1706 can release the sidelink UE information (e.g., in event 855A). If the target base station at block 1704 determines that the interface message is for a handover procedure or an RRC reestablishment procedure, the target base station at block 1708 can retain the sidelink UE information (e.g., in event 453B).

Other implementations are possible. For example, although not illustrated in FIG. 17, if the target base station at block 1704 determines that the interface message is for an RRC reestablishment procedure, the target base station can release the sidelink UE information at block 1706 (e.g., in event 455A), instead of retaining the sidelink UE information. As another example, if the target base station at block 1704 determines that the interface message is for an RRC resume procedure, the target base station can retain the sidelink UE information at block 1706 (e.g., in event 856B), instead of releasing the sidelink UE information.

Figure 18:
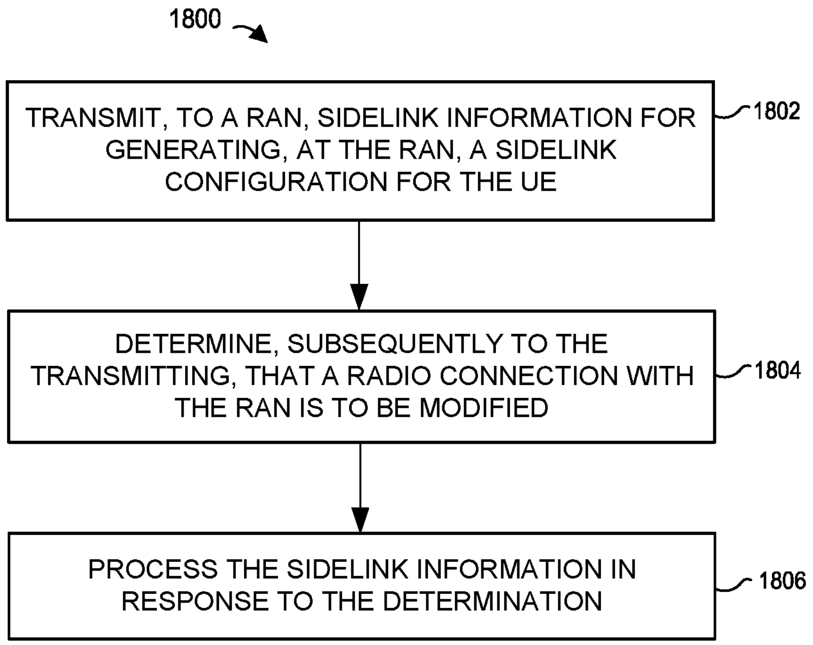
FIG. 18 is a flow diagram of an example method in which a UE of FIG. 1A processes sidelink information.

FIG. 18 is a flow diagram of an example method 1800 implemented in a UE (e.g., UE 102) for managing information related to sidelink communications. The UE has a radio connection with a RAN (e.g., RAN 105).

At block 1802, a UE transmits, to a RAN, the sidelink information for generating, at the RAN, a sidelink configuration for the UE (e.g., in events or blocks 304A, 350B, 450A, 450B, 550, 650, 750A, 750B, 850A, 850B, 902, 1002A, 1002B, 1002C, 1102, 1202, 1302).

At block 1804, the UE, subsequently to the transmitting, determines that the radio connection with the RAN is to be modified (e.g., in events or blocks 378A, 378B, 478A, 478B, 578, 678, 728A, 778B, 878A, 878B, 904, 1004A, 1004B, 1004C, 1104, 1204, 1304). In various implementations, the UE determines that the radio connection with the RAN is to be modified by detecting a failure on the radio connection, or by receiving a message from the RAN instructing the UE to suspend the radio connection.

At block 1806, the UE, in response to the determining at block 1804, processes the sidelink information (e.g., in events or blocks 352A, 354B, 452A, 454B, 554, 552, 654, 652, 752A, 754B, 852A, 854B, 908, 1006A, 1006B, 1006C, 1108, 1206, 1308, 1310). In some implementations, processing the sidelink information includes releasing the sidelink information. In other implementations, processing the sidelink information includes retaining the sidelink information.

Figure 19:
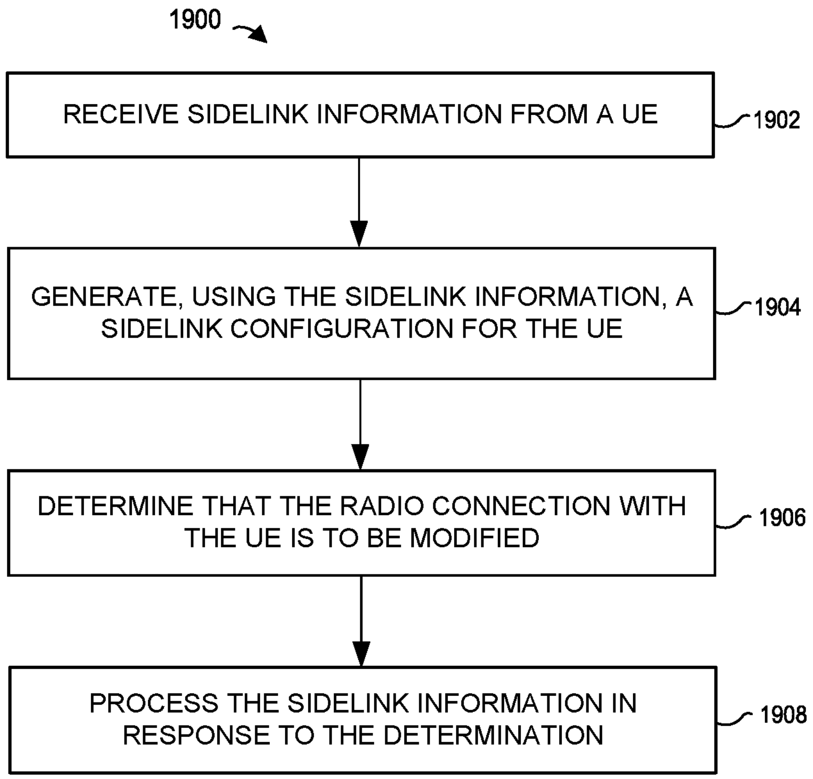
FIG. 19 is a flow diagram of an example method in which one or more base stations of FIG. 1A or 1B processes sidelink information.

FIG. 19 is a flow diagram of an example method 1900 implemented in a RAN (e.g., RAN 105) for managing information related to sidelink communications. The RAN has a radio connection with a UE (e.g., UE 102).

At block 1902, a RAN receives, from a UE, sidelink information (e.g., in events or blocks 306A, 350B, 450A, 450B, 550, 650, 750A, 750B, 850A, 850B, 1402, 1502, 1606, 1702).

At block 1904, the RAN generates, using the sidelink information, a sidelink configuration for the UE (e.g., in events 310A, 350B, 450A, 450B, 550, 650, 750A, 750B, 850A, 850B).

At block 1906, the RAN determines that the radio connection with the UE is to be modified (e.g., in events or blocks 332A, 332B, 432A, 432B, 492A, 492B, 533, 633, 724A, 778B, 832A, 832B, 878A, 878B, 1404, 1504, 1608, 1704). In various implementations, the RAN determines that the radio connection with the UE is to be modified by determining that the UE is to suspend the radio connection.

At block 1908, the RAN, in response to the determining at block 1906, processes the sidelink information (e.g., in events or blocks 351A, 353B, 455A, 453B, 553, 551, 653, 651, 751A, 753B, 855A, 856B, 853B, 1610, 1612, 1706, 1708). In some implementations, processing the sidelink information includes releasing the sidelink information. In other implementations, processing the sidelink information includes retaining the sidelink information.

The following description may be applied to the description above.

In some implementations, "message" is used and can be replaced by "information element (IE)". In some implementations, "IE" is used and can be replaced by "field".

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for handling mobility between base stations through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

Example 1. A method in a user equipment (UE) for managing information related to sidelink communications, when the UE has a radio connection with a radio access network (RAN), the method comprising: transmitting, by processing hardware of the UE to the RAN, sidelink information for generating, at the RAN, a sidelink configuration for the UE; determining, by the processing hardware and subsequently to the transmitting, that the radio connection with the RAN is to be modified; and processing, by the processing hardware, the sidelink information in response to the determination.

Example 2. The method of example 1, wherein processing the sidelink information includes retaining the sidelink information at the UE.

Example 3. The method of example 2, wherein the sidelink information is a first sidelink information, the method further comprising: subsequently to the processing, transmitting second sidelink information to the RAN.

Example 4. The method of example 3, wherein transmitting the second sidelink information includes transmitting an indication that the RAN is to release the first sidelink information.

Example 5. The method of example 3, wherein: the first sidelink information is transmitted to a first node of the RAN, and the second sidelink information is transmitted to a second node of the RAN.

Example 6. The method of example 5, wherein: the first node is a source distributed unit (S-DU) of a distributed base station; and the second node is a target distributed unit (T-DU) of the distributed base station.

Example 7. The method of example 2, further comprising: determining whether the radio connection being modified is related to a failure that the UE detects within a certain time threshold after transmitting the sidelink information; and determining, based on whether the UE detects the failure within the certain time threshold, whether the UE is to re-transmit the sidelink information to the RAN upon recovering the radio connection.

Example 8. The method of example 2, wherein the UE transmits the sidelink information to the RAN on a first cell, the method further comprises: determining whether the UE performs a re-establishment procedure on the first cell or a second cell in response to the radio connection being modified; and re-transmitting the sidelink information to the second cell if the UE performed the re-establishment procedure on the second cell.

Example 9. The method of example 1, wherein processing the sidelink information includes releasing the sidelink information.

Example 10. The method of example 9, further comprising, in response to a triggering event and subsequently to the processing: transmitting the sidelink information to the RAN.

Example 11. The method of any one of examples 1-6, 9, or 10, wherein determining that the radio connection is to be modified includes detecting a failure on the radio connection.

Example 12. The method of any one of examples 1-6, 9, or 10, wherein determining that the radio connection is to be modified includes receiving, from the RAN, a message instructing the UE to suspend the radio connection.

Example 13. The method of any one of examples 1-6, 9, or 10, wherein the processing includes determining whether the UE should release or retain the sidelink information based on whether the UE detects a failure on the radio connection.

Example 14. The method of any of the preceding examples, wherein the sidelink information indicates a frequency on which the UE prefers to establish a sidelink.

Example 15. The method of any of the preceding examples, further comprising: receiving, by the processing hardware from the RAN, the sidelink configuration for the UE.

Example 16. A UE comprising processing hardware and configured to implement a method of any of examples 1-15.

Example 17. A method in radio access network (RAN) for managing information related to sidelink communications, when a user equipment (UE) has a radio connection with the RAN, the method comprising: receiving, by processing hardware and from the UE, sidelink information; generating, by the processing hardware using the sidelink information, a sidelink configuration for the UE; determining, by the processing hardware, that the radio connection with the UE is to be modified; and processing, by the processing hardware, the sidelink information in response to the determination.

Example 18. The method of example 17, wherein processing the sidelink information includes retaining the sidelink information at the RAN.

Example 19. The method of example 18, wherein receiving the sidelink information includes receiving a first sidelink information at a first node of the RAN, the method further comprising: subsequently to the processing, receiving second sidelink information at a second node of the RAN from the UE.

Example 20. The method of example 19, wherein: the first node is a source distributed unit (S-DU) of a distributed base station; and the second node is a target distributed unit (T-DU) of the distributed base station.

Example 21. The method of example 18, wherein receiving the sidelink information includes receiving the sidelink information at a first node of the RAN, the method further comprising: transmitting, by the processing hardware, the sidelink information to a second node of the RAN.

Example 22. The method of example 18, wherein receiving the sidelink information includes receiving the sidelink information at a first node of the RAN, the method further comprising: determining to send, to a second node of the RAN, an interface message; generating an interface message that includes or excludes the sidelink information in the interface message based on determining whether the interface message relates to a procedure for resuming the suspended radio connection; and transmitting the interface message to the second node.

Example 23. The method of examples 21 or 22, wherein: the first node is a source base station; and the second node is associated with a target base station.

Example 24. The method of example 23, further comprising: retaining the sidelink information at the second node.

Example 25. The method of example 23, further comprising: releasing the sidelink information at the second node.

Example 26. The method of example 21, wherein: the first node is a centralized unit (CU) of a distributed base station; and the second node is a target distributed unit (T-DU) of the distributed base station.

Example 27. The method of example 17, wherein processing the sidelink information includes releasing the sidelink information at the RAN.

Example 28. The method of example 27, wherein receiving the sidelink information includes receiving the sidelink information at a first node of the RAN, the method further comprising: subsequently to the processing, receiving the sidelink information at a second node of the RAN from the UE.

Example 29. The method of example 27, wherein receiving the sidelink information includes receiving a first sidelink information at a first node of the RAN, the method further comprising: subsequently to the processing, receiving second sidelink information at a second node of the RAN from the UE.

Example 30. The method of any of examples 17-25 and 27-29, wherein determining that the radio connection is to be modified includes receiving an indication of a communication failure at the RAN.

Example 31. The method of any of examples 17-29, wherein determining that the radio connection is to be modified includes determining that the UE is to suspend the radio connection.

Example 32. The method of any of examples 17-31, wherein the sidelink information indicates a frequency on which the UE prefers to establish a sidelink.

Example 33. The method of any of examples 17-32, further comprising: transmitting the sidelink configuration to the UE.

Example 34. One or more base stations comprising processing hardware and configured to implement a method of any of examples 17-33.

What is claimed is:

1. A method in a user equipment (UE) for managing information related to sidelink communications, when the UE has a radio connection with a radio access network (RAN), the method comprising:

receiving, by the UE and from the RAN, a sidelink configuration;

detecting, by the UE, a failure on the radio connection with the RAN;

transmitting, by the UE, a radio resource control (RRC) reestablishment request to the RAN in response to the detecting of the failure; and releasing, by the UE, the sidelink configuration in conjunction with the transmitting of the RRC reestablishment request.

2. The method of claim 1, wherein the failure on the radio connection is a radio link failure, a handover failure, an integrity check failure, or another reconfiguration failure.

3. The method of claim 1, further comprising transmitting, by the UE, sidelink information to the RAN.

4. A UE comprising processing hardware and configured to implement the method of claim 1.

5. The method of claim 1, further comprising transmitting, by the UE and to the RAN, sidelink information for generating, at the RAN, the sidelink configuration for the UE.

* * * * *